US009500394B2

(12) United States Patent
Manzo

(10) Patent No.: US 9,500,394 B2
(45) Date of Patent: Nov. 22, 2016

(54) RETRO-FIT ENERGY EXCHANGE SYSTEM FOR TRANSPARENT INCORPORATION INTO A PLURALITY OF EXISTING ENERGY TRANSFER SYSTEMS

(75) Inventor: Aniello Manzo, Burnaby (CA)

(73) Assignee: ENERGY RECOVERY SYSTEMS INC., Vancouver, British Columbia (CA)

( * ) Notice: Subject to any disclaimer, the term of this patent is extended or adjusted under 35 U.S.C. 154(b) by 965 days.

(21) Appl. No.: 13/641,566

(22) PCT Filed: Apr. 7, 2011

(86) PCT No.: PCT/CA2011/000403
§ 371 (c)(1),
(2), (4) Date: Oct. 16, 2012

(87) PCT Pub. No.: WO2011/127571
PCT Pub. Date: Oct. 20, 2011

(65) Prior Publication Data
US 2013/0037249 A1    Feb. 14, 2013

(30) Foreign Application Priority Data

Apr. 16, 2010    (WO) ............... PCT/CA2010/000605

(51) Int. Cl.
*F25B 25/00*  (2006.01)
*F25B 29/00*  (2006.01)
*F24D 19/10*  (2006.01)
(Continued)

(52) U.S. Cl.
CPC ......... *F25B 29/003* (2013.01); *F24D 19/1006* (2013.01); *F24F 11/0009* (2013.01); *F25B 29/00* (2013.01); *F25B 49/02* (2013.01); *Y10T 137/6416* (2015.04)

(58) Field of Classification Search
CPC ...... F25B 29/003; F25B 29/00; F25B 49/02; F25B 39/04; F24D 19/1006; F24F 11/0009; F28B 1/02; Y10T 137/6416
USPC ...................................... 165/200, 48.1, 210
See application file for complete search history.

(56) References Cited

U.S. PATENT DOCUMENTS

| 1,969,187 A | 8/1934 | Schutt |
| 2,456,386 A | 12/1948 | Cooper |
| 3,922,876 A | 12/1975 | Wetherington, Jr. et al. |

(Continued)

FOREIGN PATENT DOCUMENTS

| CA | 2229355 C | 2/1999 |
| CA | 2574996 A1 | 12/2006 |

(Continued)

OTHER PUBLICATIONS

International Search Report and Written Opinion of the International Searching Authority in corresponding International Application PCT/CA2011/000403, mailed Apr. 7, 2011.

(Continued)

*Primary Examiner* — Tho V Duong
*Assistant Examiner* — Raheena Rehman
(74) *Attorney, Agent, or Firm* — Perry + Currier, Inc.

(57) ABSTRACT

A controller connectable to a plurality of energy sources, energy demands and energy transfer units is contemplated. The controller is configurable to dynamically route excess energy from different sources to different demands via the energy transfer unit(s).

14 Claims, 20 Drawing Sheets

(51) Int. Cl.
*F24F 11/00* (2006.01)
*F25B 49/02* (2006.01)

(56) References Cited

U.S. PATENT DOCUMENTS

| | | | |
|---|---|---|---|
| 4,098,092 A | | 7/1978 | Singh |
| 4,141,222 A | | 2/1979 | Ritchie |
| 4,142,379 A | | 3/1979 | Kuklinski |
| 4,199,955 A | | 4/1980 | Jonsson |
| 4,226,606 A | | 10/1980 | Yaeger et al. |
| 4,238,931 A | | 12/1980 | Campbell |
| 4,241,588 A | | 12/1980 | Murphy et al. |
| 4,281,519 A | | 8/1981 | Spath et al. |
| 4,293,323 A | | 10/1981 | Cohen |
| 4,386,500 A | | 6/1983 | Sigafoose |
| 4,492,092 A | | 1/1985 | Smorol et al. |
| 4,680,941 A | | 7/1987 | Richardson et al. |
| 4,685,307 A | | 8/1987 | Jones |
| 4,732,007 A | | 3/1988 | Dolan et al. |
| 4,773,231 A | | 9/1988 | Sulzberger |
| 5,020,721 A | * | 6/1991 | Horne .................... F24H 1/186 122/14.3 |
| 5,050,394 A | | 9/1991 | Dudley et al. |
| 5,220,807 A | * | 6/1993 | Bourne .................. F24D 17/02 165/58 |
| 5,351,502 A | | 10/1994 | Gilles et al. |
| 5,575,159 A | | 11/1996 | Dittell |
| 5,695,004 A | | 12/1997 | Beckwith |
| 5,758,820 A | * | 6/1998 | Celorier, Jr. ....... G05D 23/1931 237/2 B |
| 5,906,104 A | | 5/1999 | Schwartz et al. |
| 5,984,198 A | | 11/1999 | Bennett et al. |
| 8,037,931 B2 | * | 10/2011 | Penev ................. F24D 17/0021 126/585 |
| 2001/0003347 A1 | | 6/2001 | Shimoda et al. |
| 2002/0020175 A1 | | 2/2002 | Street et al. |
| 2005/0039878 A1 | | 2/2005 | Meyer et al. |
| 2005/0066678 A1 | | 3/2005 | Kamimura |
| 2007/0000262 A1 | * | 1/2007 | Ikegami ................. F25B 41/00 62/170 |
| 2010/0064710 A1 | | 3/2010 | Slaughter |
| 2010/0193152 A1 | | 8/2010 | Singleton, Jr. et al. |
| 2014/0026608 A1 | | 1/2014 | Manzo et al. |

FOREIGN PATENT DOCUMENTS

| | | |
|---|---|---|
| CN | 101240949 B | 8/2008 |
| GB | 2052712 | 1/1981 |
| WO | 2004051148 A1 | 6/2004 |

OTHER PUBLICATIONS

Non-Final Office Action dated Jul. 9, 2015, issued in corresponding U.S. Appl. No. 13/641,540, filed Oct. 16, 2012.

* cited by examiner ary method

RETRO-FIT ENERGY EXCHANGE SYSTEM FOR TRANSPARENT INCORPORATION INTO A PLURALITY OF EXISTING ENERGY TRANSFER SYSTEMS

CROSS REFERENCE TO RELATED APPLICATIONS

This application is a 35 U.S.C. §371 national stage application claiming priority benefits of International Patent Application No. PCT/CA2011/000403, filed Apr. 7, 2011, which claims the benefit of International Patent Application No. PCT/CA2010/000605, which are all hereby incorporated herein by reference in their entireties.

FIELD

The present invention relates generally to energy exchange and distribution systems including heating, ventilation, air-conditioning and water heating, and more particularly relates to a retrofit energy exchange system for transparent incorporation into a plurality of existing energy transfer systems.

BACKGROUND

It is known to employ energy exchange technologies in order to, for example, recover excess heat from an air-conditioning system to provide energy to heat water. The prior art has many examples of such heat-exchange technologies. A cluster of prior art references are also found from the early 1980s which reflect the end of the energy crises of the 1970s. It is interesting to note that these heat-exchange technologies have not been generally adopted, despite their apparent advantages.

SUMMARY

An aspect of this specification provides:

a first set of valves for connection to a first connection point of a first energy transfer sub-system; said first energy transfer sub-system having a potential excess supply of energy available at said first connection point; said first energy transfer system connected a first controller; said first controller configured to receive at least one first input for providing data to said first controller; said first controller configured to send at least one output to said first energy transfer sub-system for selectively instructing activation or deactivation of said first energy transfer sub-system to thereby generate said potential excess supply of energy; said first controller having a passive connection point configured to output a first set data received from said first input;

a second set of valves for connection to a second connection point of a second energy transfer sub-system; said second energy transfer sub-system having a potential demand for energy at said second connection point; said second energy transfer system connected a second controller; said second controller configured to receive at least one second input for providing data to said second controller; said second controller configured to send at least one output to said second energy transfer sub-system for selectively instructing activation or deactivation of said second energy transfer sub-system to thereby realize said potential demand for energy; said second controller having a passive connection point to output a second set of data received from said second input;

an energy exchange unit connectable to said first set of valves via a first conduit; said energy transfer unit connectable to said second set of valves via a second conduit; an energy exchange unit controller connectable to said first energy transfer sub-system and said second energy transfer sub-system to receive said first inputs and said at least one second input; said energy exchange unit controller configured to activate said energy exchange unit when said energy exchange unit controller determines, based on said first input and said second input, that a present excess supply of energy from said first energy transfer system is available to satisfy a present demand for energy at said second energy transfer sub-system.

DETAILED DESCRIPTION OF THE EMBODIMENTS

Figure 1:
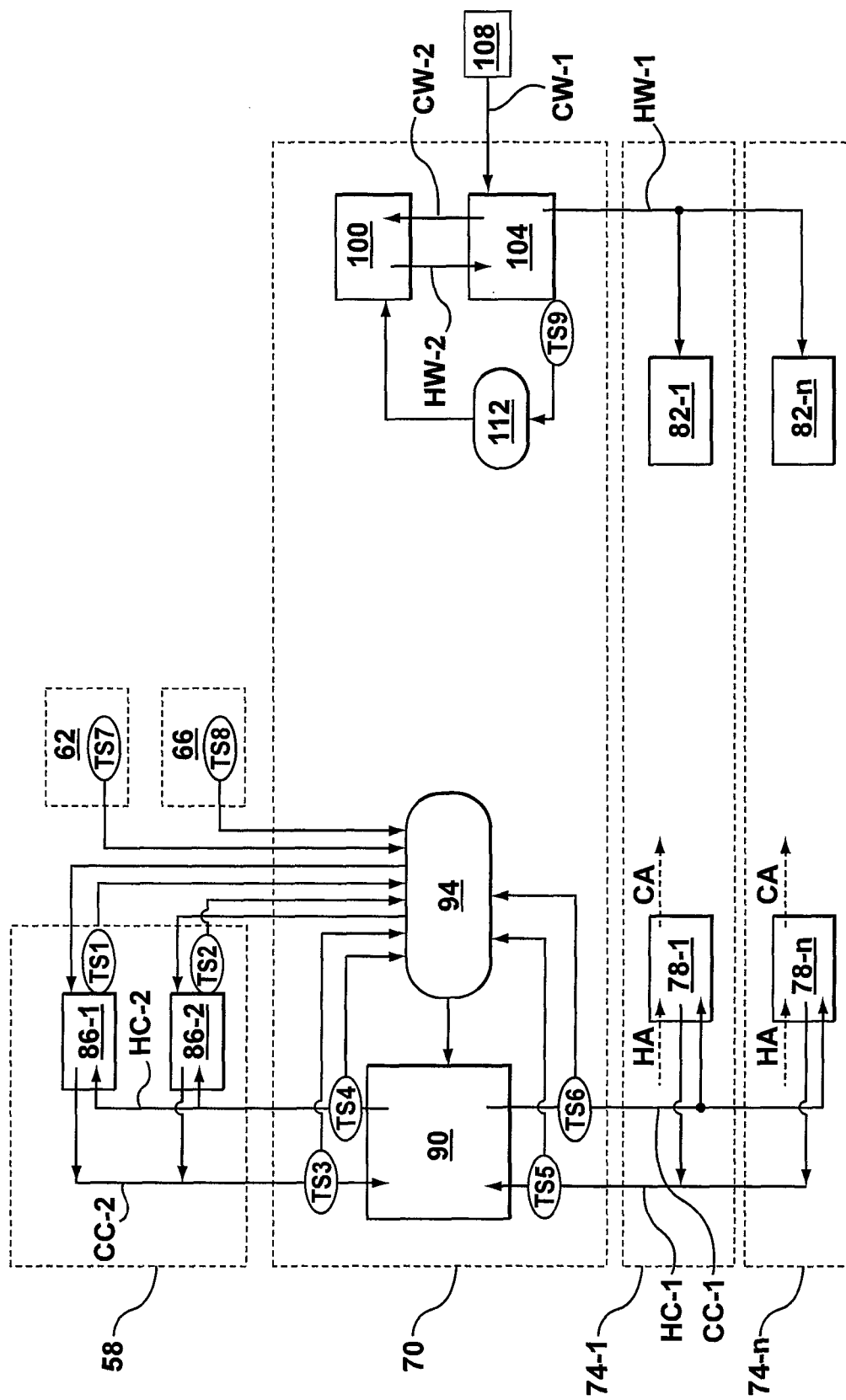
FIG. 1 shows a prior art complete air-conditioning system and separate hot water system for a multi-unit structure.

The teachings herein have application to a wide variety of existing energy transfer systems. An example of an energy system is shown in FIG. 1 and indicated generally at 50. Energy system 50 is incorporated into a multi-unit structure, such as an apartment building or office tower. Thus, a plurality of suites 74-1 . . . 74-n are found through-out the structure. Generically, each suite is referred to as suite 74, while collectively, all suites are referred to as suites 74. This nomenclature is used elsewhere herein.) A cooling tower 58 is also provided on the roof of the structure. The structure also comprises at least one indoor common area 62, such as a hallway or foyer. In FIG. 1, the structure is also defined in terms of its context in relation to at least one outdoor area 66 that is outside the structure. A mechanical room 70 is also provided in the basement of the structure.

Each suite 74 comprises a heat transfer coil 78, which is shown in FIG. 1 as operating in an air-conditioning mode whereby energy within hot air HA passing over coil 78 is absorbed by a cold coolant CC-1 that passes through coil 78, such that cold air CA exits coil 78 and into suite 74 and hot coolant HC-1 exits coil 78, the energy from the hot air HA having been absorbed the cold coolant CC-1. Each suite 74 also comprises a hot water demand 82. Hot water demand 82 can be any one of a sink, shower, or bathtub or other fixture which can receive hot water HW-1.

Cooling tower 58 comprises a plurality of heat transfer units such as heat transfer units 86-1 and 86-2, each of which can receive hot coolant HC-2 and transfer energy therefrom into the ambient air on the rooftop and then return cold coolant CC-2. It should be noted that in other embodiments, more or less than two heat transfer units may be used. Each transfer unit 86-1 or 86-2 also comprises at least one temperature sensor TS1 or TS2 respectively that sends an electronic output therefrom representing a temperature reading of the ambient air on the rooftop or the temperature of hot coolant HC-2 or cold coolant CC-2 or all of them.

Indoor common area 62 comprises at least one temperature sensor TS7 that sends an electrical output representing a temperature reading of the ambient air of that common area. Note that indoor common area 62 can, in variations, comprise a heat transfer coil (not shown).

Outdoor area 66 comprises at least one temperature sensor TS8 that sends an electrical output representing a temperature reading of the ambient air respective to the location of that temperature sensor TS8. Note that where a plurality of temperature sensors TS8 are provided, each of those sensors may be located on different sides and heights of the structure, such that the actual temperature reading from each can vary substantially according to time of day and when a particular temperature sensor is exposed to sun, shade, wind or other environmental variables.

Mechanical room 70 comprises a central energy exchange unit 90 that interconnects cooling tower 58 and transfer coils 78, where excess energy from hot coolant HC-1 is transferred to cold coolant CC-2 to thereby generate hot coolant HC-2 and cold coolant CC-1. A temperature sensor TS3 connects to a cold coolant line to sense the temperature of cold coolant CC-2 as it enters central energy exchange unit 90. A temperature sensor TS4 connects to a hot coolant line to sense the temperature of hot coolant HC-2 as it leaves central energy exchange unit 90. A temperature sensor TS5 connects to another hot coolant line to sense the temperature of hot coolant HC-1 as it enters central energy exchange unit 90. A temperature sensor TS6 connects to another cold coolant line to sense the temperature of hot coolant CC-1 as it leaves central energy exchange unit 90.

A first controller 94 receives input from temperature sensors TS1 to TS8, and also connects to central energy exchange unit 90 and to heat transfer unit 86-1 or 86-2 to selectively activate or deactivate central energy exchange unit 90 or heat transfer unit 86-1 or 86-2 or all of them according to temperatures from temperature sensors TS1 to TS8. More specifically, first controller 94 infers demand for cooling from suites 74 via temperature sensor TS5 and temperature sensor TS6, while at the same time infers cooling capacity of cooling tower 58 using temperature sensors TS1, TS2, TS3, TS4, TS7 or TS8. From such inferences, first controller 94 can selectively activate pumps, compressors and fans associated with central energy exchange unit 90 and heat transfer unit 86-1 or 86-2 to satisfy demand from suites 74. First controller 94 also typically includes an output port based on a standard format (e.g. RJ45/Ethernet, or Universal Serial Bus, or RS-232, or the like) for monitoring first controller 94.

The foregoing description of the structure and operation of transfer coils 78, central energy exchange unit 90 and heat transfer unit 86-1 or 86-2 are intended to capture a generic cooling system that can be employed to provide a cooling system for suites 74. It is to be understood, however, that the actual implementations vary according a number of variables, including the size of suites 74, the size and manufacturer of transfer coils 78, central energy exchange unit 90, heat transfer unit 86-1 or 86-2, and first controller 94 and the climate in which the structure is located. Those skilled in the art will appreciate that first controller 94 is uniquely programmed according to the unique installation for a given structure and combination of transfer coils 78, heat transfer unit 86-1 or 86-2, temperature sensors TS1 to TS8 and central energy exchange units 90. Therefore, notwithstanding the generic description provided, the specific embodiment for a given structure will be expected to be different, and possibly substantially different, for each and every structure. Table I shows examples of specific manufacturers and model descriptions that can be employed to implement such a cooling system for suites 74.

TABLE I

Example components for Cooling System

| Common Product Name | Manufacturer | Model | Suitable For |
| --- | --- | --- | --- |
| Heat pump | Carrier | 25HNA9 | Transfer coil 78 |
| Roof top chiller | Carrier | 50VL | Heat Transfer units 86 |
| Programmable Logic Controller | Honeywell | 2MLR-CPUH/F | First controller 94 |

Mechanical room 70 also comprises a domestic water heating unit 100 and water tank 104 and that is configured to receive domestic cold water from a municipal water supply 108. Temperature sensor TS9 that is associated with tank 104 and is able to determine water temperature associated with tank 104. Temperature sensor TS9 is connected to a second controller 112 which in turn connects to heating unit 100. Second controller 112 is configured to activate or deactivate a heating element (e.g. a gas flame) within heating unit 100 based on temperature sensed at temperature sensor TS9. Temperature sensor TS9 thus comprises an output line that sends a temperature signal to second controller 112. Domestic cold water CW-1 from supply 108 enters tank 104 and can flow into heating unit 100 as cold water CW-2 where it undergoes an increase in temperature and then domestic hot water HW-2 flows back into tank 104. As water demand(s) 82 are activated, hot water HW is drawn from tank 104 to the activated demand.

Again, the foregoing description of the structure and operation of heating unit 100 and water tank 104 and second controller 112 are intended to capture a generic water heating system that can be employed to provide hot water to suites 74. It is to be understood, however, that the actual embodiments vary according a number of variables, including the size of suites 74, the size and manufacturer of heating unit 100, water tank 104, second controller 112, the temperature of water received from domestic water supply 108, and the climate in which the structure is located. Those skilled in the art will appreciate that second controller 112 is uniquely configured according to the unique installation for a given structure and combination of heating unit 100, water tank 104. Therefore, notwithstanding the generic description provided, the specific embodiment for a given structure will be expected to be different, and possibly substantially different, for each and every structure. Table II shows examples of specific manufacturers and model descriptions that can be employed to implement such a water heating system for suites 74.

TABLE II

Example components for Water Heating System

| Common Product Name | Manufacturer | Model | Suitable For |
|---|---|---|---|
| Water Tank | Rheem | GHE100-130 (A) | Water tank 104 |
| Aquastat | Honeywell | L4006 | Second controller 112 |
| Programmable Logic Controller | Honeywell | 2MLR-CPUF | Second controller 112 |
| Heating Unit | Burnham | P203 | Water heater 100 |

In will be noted that is some embodiments of system 50, second controller 112 can be a dual set-point aquastat. Such a dual point aquastat may be used in different ways depending on the existing installation as will be understood by those of skill in the art.

Figure 2:
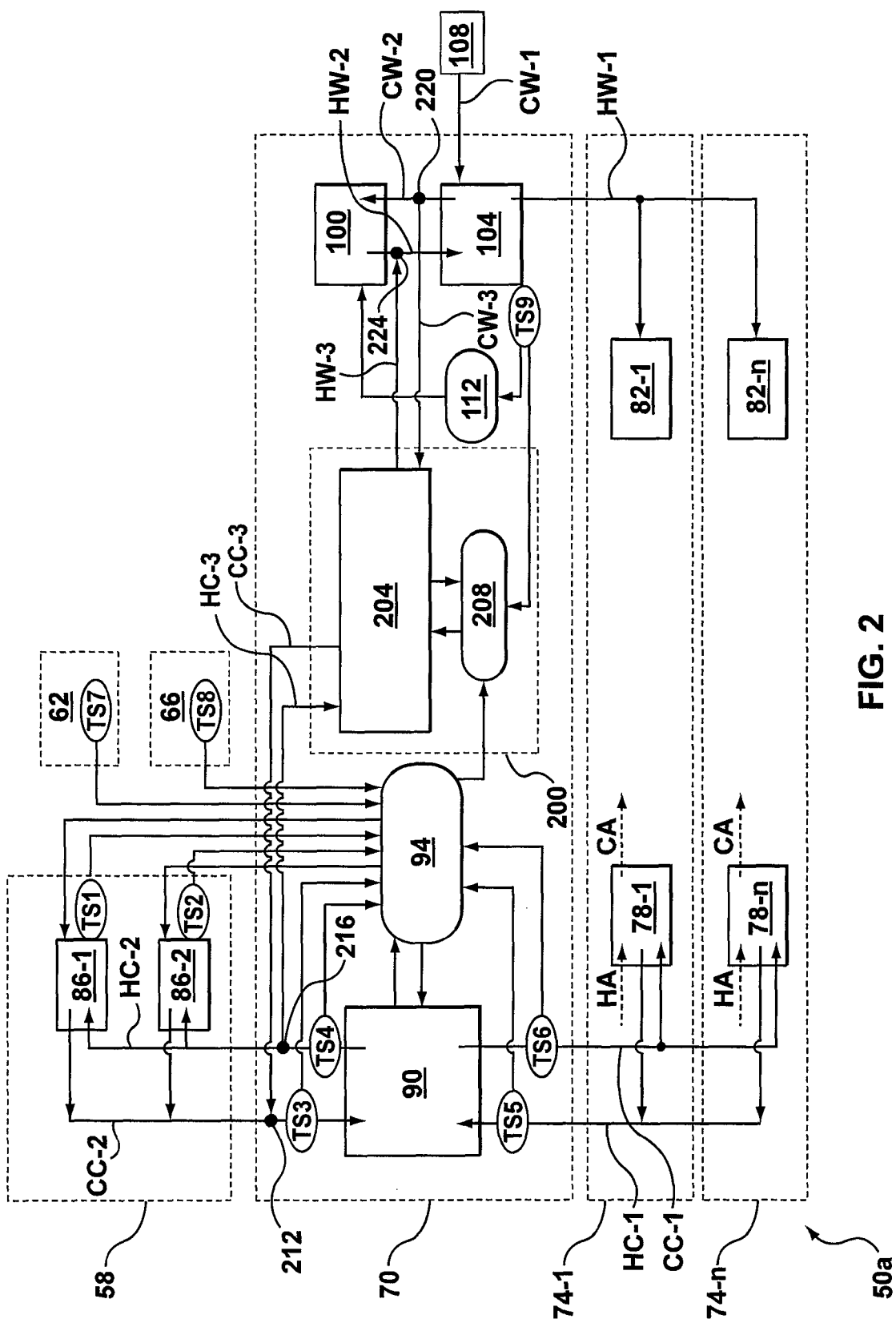
FIG. 2 shows a retrofit system incorporated into a complete air-conditioning system and separate hot water system for a multi-unit structure.

Referring now to FIG. 2, a retrofit energy exchange system is indicated at 200, which becomes part of an energy system 50a. Like components in system 50a bear like references to their counterparts in system 50. System 200 comprises an energy exchange unit 204, an energy exchange controller 208, a first valve 212 for tapping into the cold coolant line carrying cold coolant CC-2, a coolant return line (for carrying cold coolant CC-3) to connect energy exchange unit 204 to first valve 212, a second valve 216 for tapping into the hot coolant line carrying hot coolant HC-2, a coolant supply line (for carrying hot coolant HC-3) that connects energy exchange unit 204 to second valve 216, a third valve 220 for tapping into the cold water line carrying for cold water CW-2, a cold water line (for carrying cold water CW-3) connecting energy exchange unit 204 with third valve 220, a fourth valve 224 for tapping into the hot water line carrying hot water HW-2, and a hot water line (for carrying hot water HW-3) connecting fourth valve 224 to energy exchange unit 204.

As will be discussed in greater detail below, system 200 is "turn-key" and is configured to connect to any combination of different individual components that can be used to implement the components shown in FIG. 1, including, for example, any embodiment of various combinations of components from Table I and Table II, without requiring material modification to any of those components.

An example energy exchange unit 204 will now be discussed with reference to FIG. 3. Energy exchange unit 204 generally incorporates the components of a conventional vapour-compression refrigeration cycle, namely a compressor 320, a condenser 322, and an evaporator 324. In addition, energy exchange unit 204 comprises a heat reclamation unit 326. Heat reclamation unit 326 is placed in thermal communication with cold water CW-3 to produce hot water HW-3. Evaporator 324 is placed in thermal communication with hot coolant HC-3 to produce cold coolant CC-3. Condenser 322 can be operated in either an air-cooled format, or a liquid-cooled format. (Where liquid cooled, cold water CW-3 can also be directed to flow over condenser 322, although this is not shown in FIG. 3.) In the air-cooled format, the condenser 322 is placed in thermal communication with ambient air. Each of the above-noted components is provided with suitable tubing and fittings, to permit the cyclical flow of a refrigerant through these components.

Compressor 320 is responsible for moving the refrigerant through the system, and for compressing the refrigerant into a hot, high-pressure refrigerant vapour. Exemplary compressors used in typical vapour-compression systems include reciprocating, rotary screw, centrifugal, scroll, variable-speed and two-speed compressors.

In a typical cycle, refrigerant R flows in the directional order of compressor 320, heat reclamation unit 326, condenser 322, evaporator 324, and back to compressor 320. The vapour-compression system generally described above may comprise additional components for proper and efficient operation. For example, energy exchange unit 204 also comprises a metering device 332 situated between condenser 322 and evaporator 324. Metering device 332 provides a throttling effect to drop the pressure and temperature of the refrigerant, while also controlling the flow of refrigerant into the evaporator 324. Exemplary metering devices include expansion valves (e.g. thermostatic expansion valves) and capillary tubes.

In general, during a typical cycle of the water chiller system, refrigerant R is pressurized at the compressor 320, turning it into a high-pressure, high temperature vapour. High-pressure, high temperature vapour then enters the heat reclamation unit 326, transferring a portion of the heat to a second medium, for example the cold water CW-3. As such, cold water CW-3 is heated, and subsequently delivered to tank 104, effectively providing at least some hot water for tank 104 without using heating unit 100. Next, the high-pressure, high-temperature refrigerant R in the form of vapour enters condenser 322 wherein it transfers additional heat to a comparatively cooler medium, (either air or a liquid), causing condensation of refrigerant R into a high-pressure, high-temperature liquid. The high-pressure, high-temperature liquid then exits condenser 322, and is subject to throttling at metering device 332 prior to entry into the evaporator 324. As such, heat transfer from hot coolant HC-3 to refrigerant R occurs evaporator 324, at which point the low-pressure, low temperature liquid is turned into a low-pressure, low-temperature vapour. As a result of the heat transfer in the evaporator 324, hot coolant HC-3 becomes cold coolant CC-3 and is returned to energy exchange unit 90, effectively providing at least some cold coolant CC-3 without relying on cooling tower 58. To complete the cycle, the refrigerant in the form of low-pressure, low-temperature vapour passes back to the compressor 320 for a subsequent cycle.

In general, the portion of the cycle between the compressor 320 and the metering device 332 on the side of the condenser 322 is considered the high pressure high temperature region of the cycle. In turn, the portion of the cycle on the side of the evaporator 324 is considered the low pressure low temperature region. As such, energy exchange unit 204 provides for heating at the heat reclamation unit 326 in the high pressure high temperature region, and further provides for cooling at the evaporator 324 in the low pressure low temperature region.

As mentioned above, an exemplary metering device 332 suitable for use in the water chiller system is an expansion valve. In one embodiment, metering device 332 is an adjustable expansion valve. Metering device 332, and metering devices in general, meter the flow of refrigerant from the high pressure side of the vapour compression cycle to the low pressure side. With an adjustable expansion valve, the metering of refrigerant across this threshold can be varied in accordance with the heat loads of the system. Under conditions of reduced load, such as where a decreased temperature differential across the evaporator 324 is required, less heat is transferred to the refrigerant, reducing the amount of energy available to convert the refrigerant to vapour. Without adjusting the metering device 332 to meet the required load, excessive amounts of refrigerant may pass into the evaporator 324, with possible liquid refrigerant passing through and onto the compressor 320. This condition is generally referred to as "flooding", and can damage the compressor 320. In circumstances where there is increased load, a greater amount of refrigerant R is used to handle the increased demand for heat transfer. Insufficient refrigerant R flow into the evaporator 324 can lead to "starvation" at the evaporator 324 and compressor 320. Both circumstances result in reduced overall efficiency, with possible damaging effects to the system.

Figure 3:
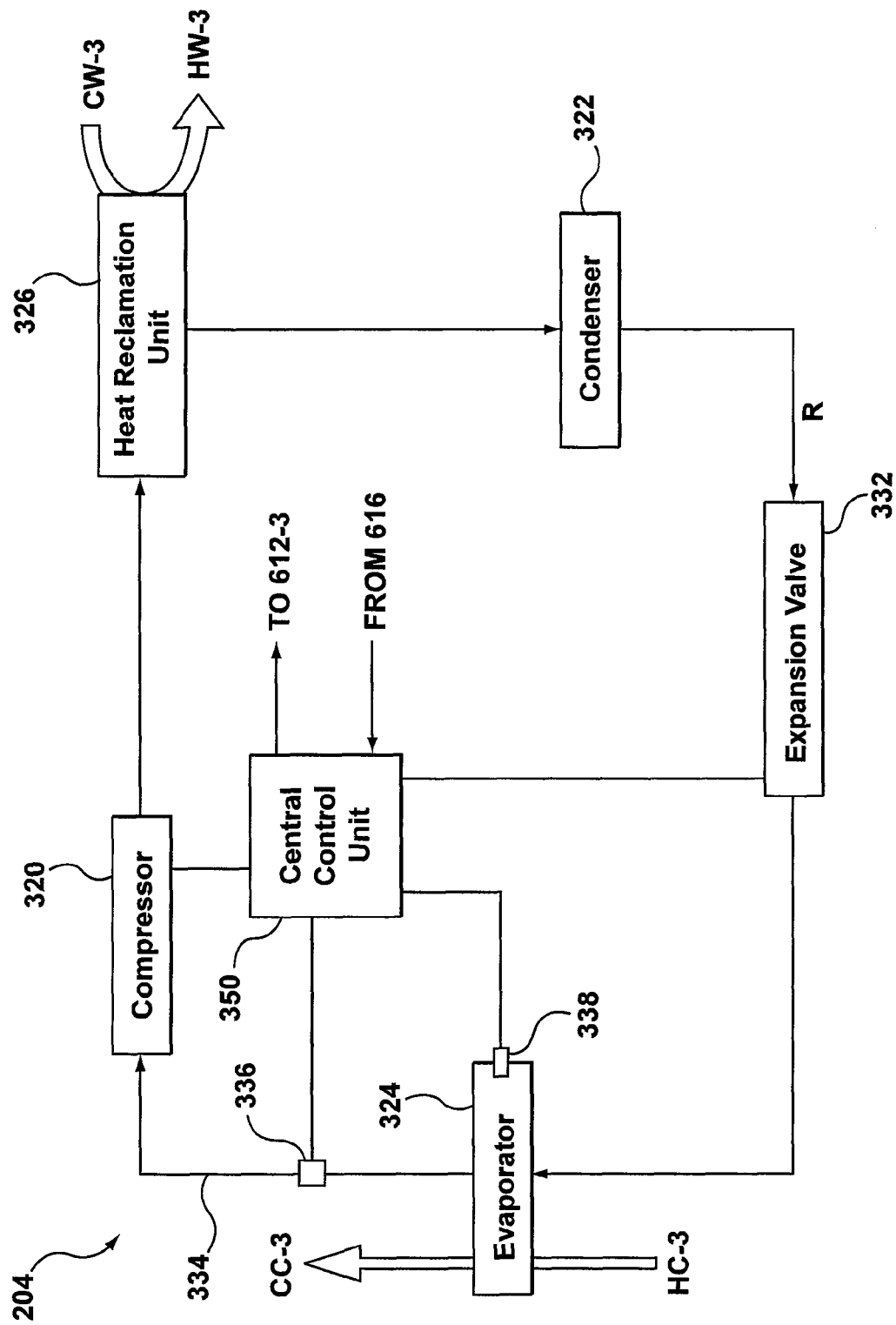
FIG. 3 shows a schematic representation of an exemplary energy exchange unit that can be used in the system of FIG. 2.

As shown in FIG. 3, a central control unit 350 (which can be implemented as part of energy exchange controller 208, or central control unit can be implemented as a stand-alone unit in communication with exchange controller 208) is used to monitor and control the metering device 332 during operation of energy exchange unit 204. Central control unit 350 is configured to signal system components, for example the metering device 332 and compressor 320, based on inputs received from one or more sensors placed on the energy exchange unit 204. The central control unit 350 comprises a microcomputer comprised of one or more central processing units connected to volatile memory (e.g. random access memory) and non-volatile memory (e.g. FLASH memory). Data input, analysis and functional control processes are received/executed in the one or more processing units comprising the control unit. The microcomputer includes a hardware configuration that can comprise one or more input devices in the form of a keyboard, a mouse and the like; as well as one more output devices in the form of a display, printer and the like.

To assess the heat load of energy exchange unit 204, refrigerant return tube 334 between is fitted with a temperature sensor 336. In some embodiments, central control unit 350 may also receive input from a fluid level sensor 338 within the evaporator 324. Based on inputs from the one or more sensors, the metering device 332 can be adjusted to meter a more suitable flow of refrigerant R from the high pressure side of the vapour-compression cycle, to the low pressure side. With the central control unit 350 monitoring the temperature of the exiting vapour from the evaporator 324, and the fluid level of the refrigerant contained therein, a balance between the extremes of "flooding" and "starvation" of the evaporator 324 and compressor 320 can be established, thereby improving the overall efficiency of the system. In one embodiment, incremental adjustments of the metering device 332 achieve approximately a 5K differential, allowing energy exchange unit 204 to be efficiently tuned to match the heat load on the system.

Energy exchange unit 204 can comprise other suitable components, such as accumulators (liquid-vapour separators), compressor (or crankcase) heaters, strainers, driers, and auxiliary heating elements, as generally known in the art. Energy exchange unit 204 can also comprise a range of industry-standard fittings, as well as customized fittings to enable refrigerant maintenance and replacement, system flushing, refrigerant bypass operations, as well as a range of industry-standard operations as would be familiar to one skilled in the art.

Figure 4:
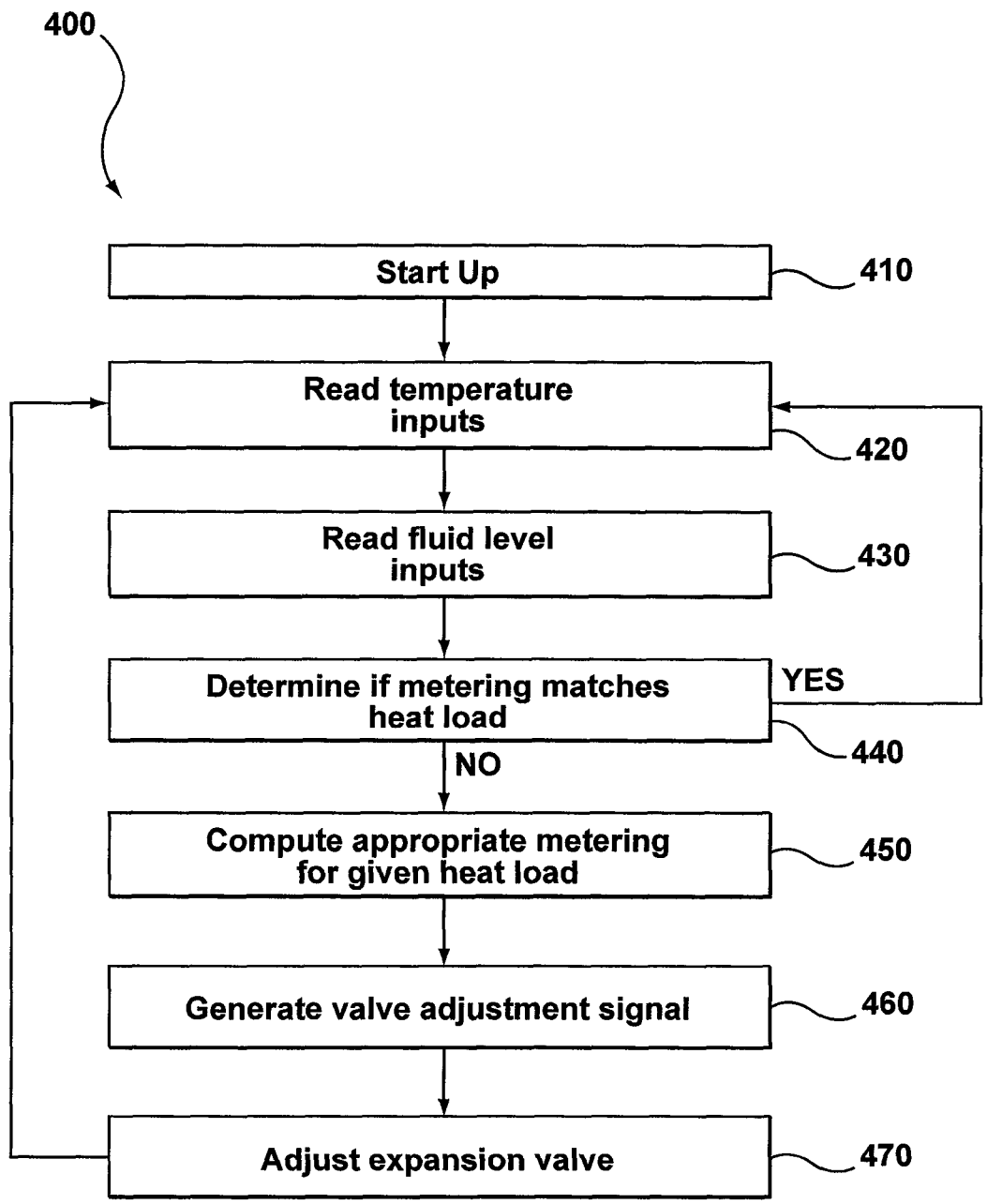
FIG. 4 shows a flow-chart depicting an exemplary method of operating the energy exchange unit of FIG. 3.

The basic operation of one embodiment of energy exchange unit 204 is generally shown in FIG. 4 at 400. Upon start-up of the energy exchange unit 204 (step 410), central control unit 350 activates the system components (e.g. compressor, sensors, etc.), and establishes an initial set-up of the adjustable metering device 332 that generally matches the expected load encountered on start-up. At step 420, the central control unit 350 reads inputs from the temperature sensor 336 of energy exchange unit 204. In other embodiments more than one temperature sensor may provide this input. At step 430, central control unit 350 reads inputs from the fluid level sensor 338 provided in the evaporator 324. At step 440, central control unit 350 uses these inputs to determine if the current metering by the metering device 332 matches the heat load on energy exchange unit 204. If the metering matches the head load, no adjustments to the expansion valve are necessary. If the metering does not match the heat load, then at step 450, the central control unit 350 computes the appropriate metering for the noted heat load. At step 460, the central control unit 350 generates and sends a valve adjustment signal to the metering device 332. At step 470, the metering device 332 is adjusted in accordance with the valve adjustment signal. The central control unit 350 then returns to step 420 for further monitoring and adjustment as necessary. The central control unit 350 can be programmed to assess the inputs from the various sensors at regular time intervals, for example once every minute, but time intervals less than, or greater than one minute are contemplated.

As will be appreciated, the use of one or more temperature sensors on energy exchange unit 204 need not be restricted to the configuration described above. The configuration described here is merely exemplary, and one can choose to use a different assembly of sensors to provide the central control unit with the necessary information to effect control over energy exchange unit 204.

As briefly mentioned above, the screw-type compressor is quite effective for use in the water chiller system. In some embodiments, the screw-type compressor, in particular a variable frequency screw-type compressor can provide additional benefits and control to the water chiller system.

As heat loads upon energy exchange unit 204 vary, for example through changes in the flow of cold water CW-3 or cold coolant CC-3, then constant compressor capacity may result in a mismatched flow of refrigerant through the evaporator 224, resulting in the aforementioned "flooding" or "starvation" conditions. As such, variable frequency compressors, in particular variable frequency screw-type compressors can be used to vary the amount of refrigerant flowing through the evaporator 324 and into the compressor 320. This form of control is generally known in the art as capacity control.

Control of the variable frequency compressor 320 is provided by the central control unit 350. Based on inputs provided by sensors, for example the aforementioned temperature sensor 336 and fluid level sensor 338, central control unit 350 is configured to determine whether or not the current flow of refrigerant R matches the given heat load. On detecting a mismatched flow of refrigerant, the central control unit 350 instructs one or both of the adjustable metering device 332 and variable frequency compressor 320 to adjust to the new condition.

(As will be discussed in greater detail below, controller 208 is also configured to ascertain if such control by control unit 350 is no longer sustaining the energy demands of tank 104 or cooling demands of central energy exchange unit 90 or both of them, and at which point to automatically disable energy exchange unit 204 such that system 50a operates as described in relation to FIG. 1 so that cold air CA, as demanded, is still provided to suites 74 and hot water HW, as demanded, is provided to suites 74.)

Figure 5:
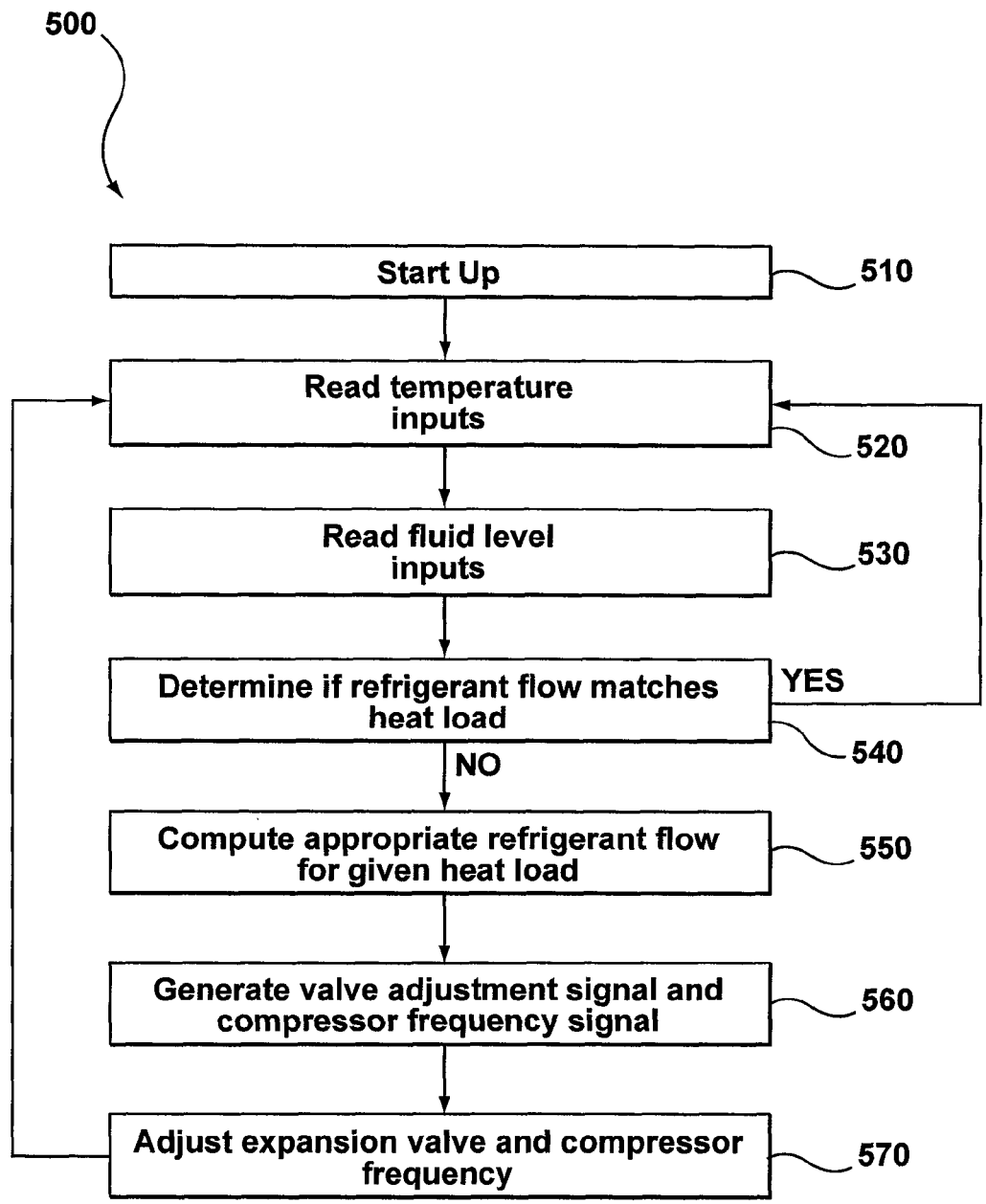
FIG. 5 shows a flow-chart depicting another exemplary method of operating the energy exchange unit of FIG. 3.

The operation of energy exchange unit 204 comprising a variable frequency compressor is shown generally in FIG. 5 at 500. Upon start-up of energy exchange unit 204 (step 510), the central control unit 350 activates the system components (e.g. compressor, sensors, etc.), and establishes an initial set-up of the metering device 332 and variable frequency compressor 320 that generally matches the expected load encountered on start-up. At step 520, the central control unit 350 reads inputs from temperature sensor 336 on energy exchange unit 204. In other embodiments more than one temperature sensor may provide this input. At step 530, the central control unit reads inputs from the fluid level sensor 338 provided in the evaporator 324. At step 540, central control unit 350 uses these inputs to determine if flow of refrigerant R through matches the heat load on energy exchange unit 204. If the metering matches the heat load, no adjustments to the metering device 332 and/or variable frequency compressor 320 are made. If refrigerant R flow does not match the heat load, then at step 550, the central control unit 350 computes an appropriate flow of refrigerant R for the noted heat load. At step 560, central control unit 350 generates and sends one or both of a valve adjustment signal and compressor frequency signal to the respective component. The combination of adjustments to the expansion valve and compressor frequency are dependent on a number of factors, including, but not limited to, maintaining the operation of each component with a range of optimal efficiency for the required refrigerant flow. At step 570, the metering device 332 and/or compressor 320 adjusts in accordance with the respective signals, the system then returns to step 520 for further monitoring and adjustment as necessary. As previously stated, the central control unit 350 can be programmed to assess the inputs from the various sensors at regular time intervals, for example once every minute, but time intervals less than, or greater than one minute are contemplated.

In some embodiments, the energy exchange unit 204 can further comprise other mechanical/electrical components to enhance the operation and or efficiency of the system. For example, to facilitate the movement of air across the condenser, one or more fan units can be implemented. In some embodiments, while presented above as separate components, the heat reclamation unit 326 and the condenser 322, may be combined into a single unit.

Figure 6:
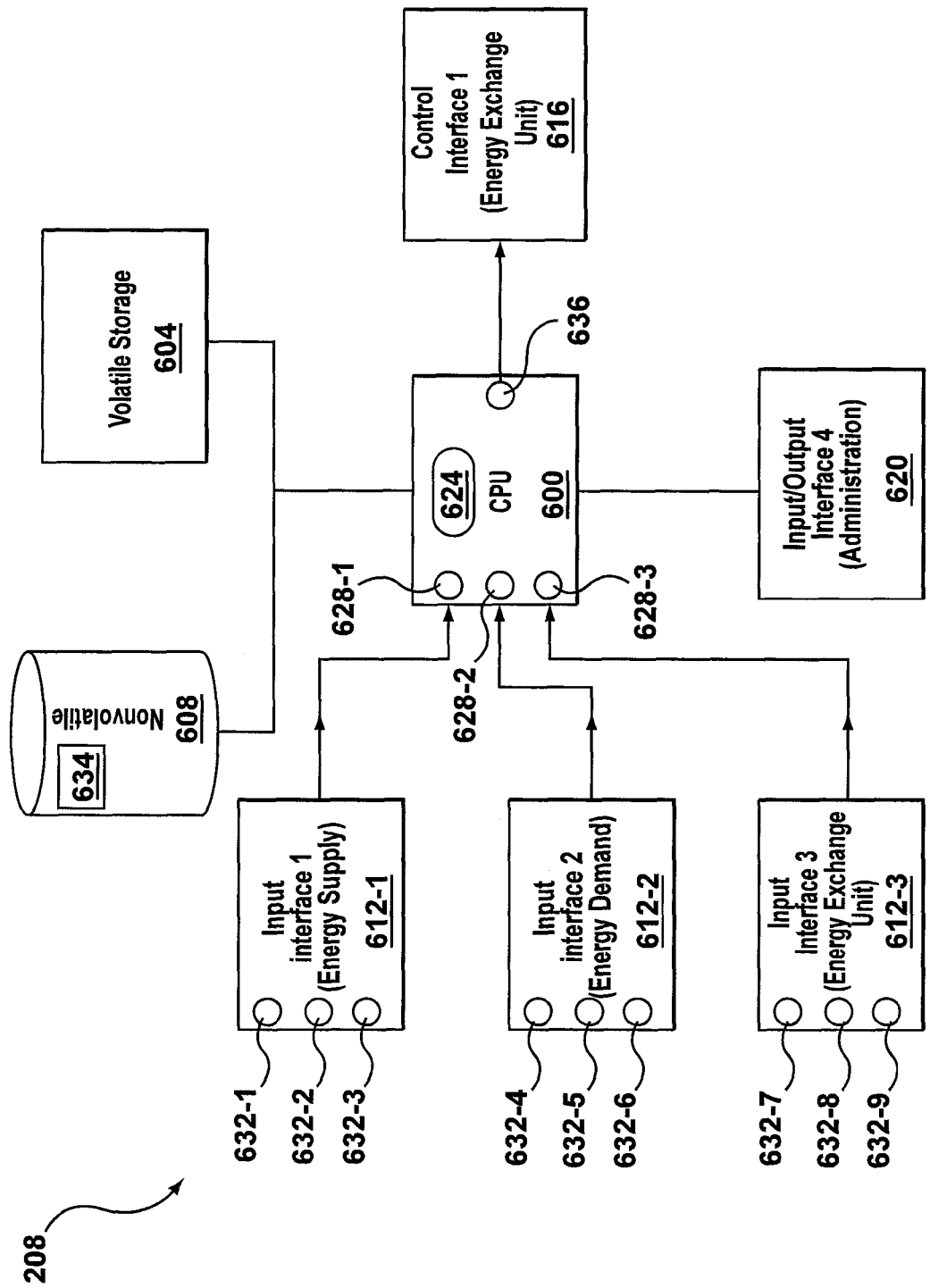
FIG. 6 shows a schematic representation of a controller for system of FIG. 2.

Referring now to FIG. 6, controller 208 is shown in greater detail. Controller 208 comprises at least one central processing unit (CPU) 600 connected to a volatile storage unit 604 (e.g. random access memory) and a non-volatile storage unit 608 (e.g. a hard disc drive) by a bus. Controller 208 also comprises a plurality of input interfaces 612 that connect to CPU 600 and provide input thereto. Controller 208 also comprises at least one control interface 616 that connects to CPU 600 and is controlled thereby. Controller 208 also comprises an administration input/output interface 620 to which a keyboard and monitor can connect, either directly or indirectly through a network such as the Internet, so that controller 208 can be administered.

CPU 600 is configured to execute a plurality of software processes, making appropriate use of volatile storage unit 604 and non-volatile storage unit 608 as needed. It should also be understood that the term software process is non-limiting, and can encompass software objects, libraries, classes and generally refers to any code that configures CPU to perform a particular function. Likewise non-volatile storage unit 608 is shown maintaining certain data records that are accessible to CPU 600.

Thus, in FIG. 6, CPU 600 is shown executing an energy exchange unit master control application 624 which receives input data from a plurality of host applications 628, where each host application 628 corresponds to a respective input interface 612. (Those skilled in the art will appreciate that other applications may also be deployed and running on CPU 600.) Also in FIG. 6, non-volatile storage unit 608 is shown maintaining an application database 634, which maintains copies of a plurality of host applications 628, including copies of the host applications 628 represented within CPU 600 of FIG. 6. Application database 634 comprises data files that can maintain a data record for a plurality of different types of energy transfer equipment (e.g. hot water heaters, air conditioning units, controllers for the same, etc.). For example, application database 634 can comprises data files for each article of equipment that is listed in Table I and Table II, or data records for additional articles of equipment not shown in Table I and Table II that can be used as energy transfer systems. The data records in application database 634 each correspond to different host applications 628 that are dynamically loadable onto CPU 600 depending on the type of equipment that is connected to input interface 612-1 or 612-2.

Each input interface 612 comprises at least one hardware port 632, with each port conforming to a different format (i.e. form factor corresponding to a particular communication protocol). For example, hardware port 632-1 can be a universal serial bus (USB) format, while hardware port 632-2 can be Ethernet or RJ-45 format. Other formats are contemplated, including terminal posts to receive an analog signal representing a temperature from, for example, temperature sensor TS9. In general, hardware ports 632 correspond to formats that are standard outputs for first controller 94 and second controller 112, or where a controller does not have a standard output, then the hardware ports correspond to an output from a temperature sensor that supplies second controller 112.

In a specific exemplary embodiment of FIG. 2 through FIG. 6, assume that first controller 94 is a commercially available with a standard Ethernet output port, in which case the hardware port 632-1 of input interface 612-1 can be an Ethernet port to receive the output from first controller 94. By the same token, assume that while second controller 112 is a commercially available Aquastat with an input port to receive data from temperature sensor TS9, while hardware port 632-4 of input interface 612-2 can be identical to the input on the Aquastat so as to receive input from temperature sensor TS9.

Continuing with these examples, CPU 600 is configured to load an appropriate host application 628 from database 634 according to the specific first controller 94 connected to input interface 612-1 and the specific temperature sensor TS9 that is connected to input interface 612-2. CPU 600 can also be configured to load such a host application 628 automatically (i.e. Plug-and-play) by detecting a particular type of data stream that is available from that hardware port 632, if such a data stream is uniquely identifiable as corresponding to a particular type of first controller 94 or temperature sensor TS9. If the data stream is not uniquely identifiable as corresponding to a particular type of first controller 94 or temperature sensor TS9, then CPU 600 can be configured to receive a manual indication of same via input received via administration input/output interface 620.

In a present embodiment, interface 612-3 is configured to receive an output signal from central control unit 350 that monitors activities of central control unit 350. Likewise a host application 628 executes on CPU 600 corresponding to central control unit 350. Control interface 616 also sends an input signal for central control unit 350 via a driver application 636 (which is also stored in application database 634) that corresponds uniquely to energy exchange unit 204. In this manner, controller 208 is dynamically configurable to work with different types of energy exchange units, other than energy exchange unit 204. Master control application 624 thus sits between host applications 628 and driver application 636 to selectively activate or control or deactivate energy exchange unit 204 according to energy demand and supply within system 50a.

Figure 7:
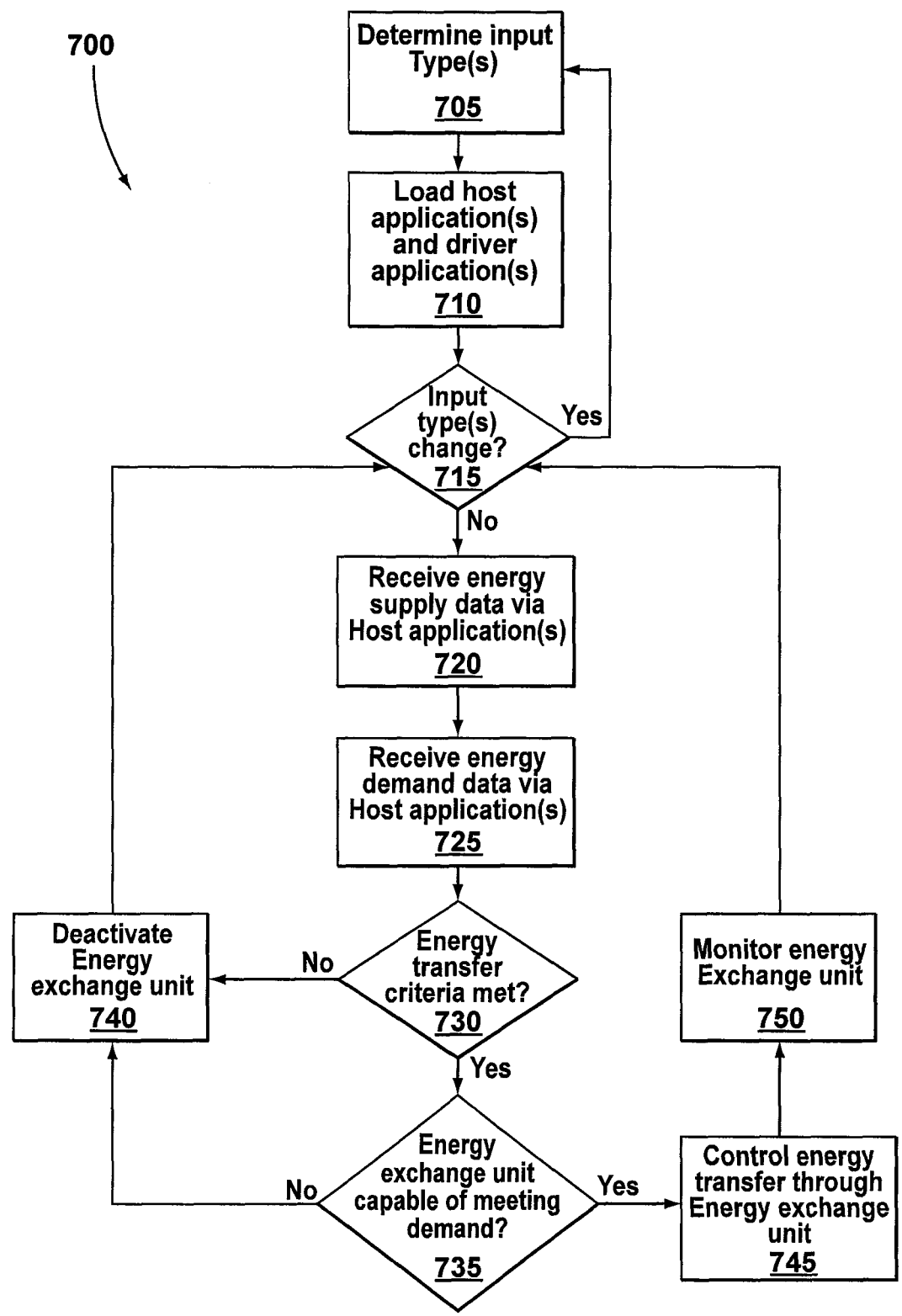
FIG. 7 shows a flow-chart depicting another exemplary method for controlling energy transfer.

Referring now to FIG. 7, a method for controlling energy transfer in accordance is depicted in the form of a flow-chart and indicated generally at 700. Method 700 can be used to implement master control application 624. Block 705 comprises determining input types. Block 705 can thus be effected as previously described, whereby master control application 624 examines input signals received via interfaces 612 to determine the type of controller or temperature sensor that is connected interface 612. Where the determination cannot be made automatically, then block 705 can comprise receiving manual input via interface 620 that identifies the type of input being received via particular interface 612.

Block 710 comprises loading applications based on the inputs detected at block 705. As previously described, block 710 thus comprises loading appropriate host applications 628 and driver application 636 from application database 634 to thereby provide software interfaces to the connected controllers or temperature sensors. Such applications 628 and application 636 thus provide master control application 624 with intelligence as to the overall structure and operational parameters of system 50a.

Block 715 comprises determining whether there have been any changes to the input types. In other words, block 715 verifies that changes have been made since the detection at block 705, and if such a change is detected, then method 700 cycles back to block 705. If not change is detected then method 700 advances to block 720.

Block 720 comprises receiving energy supply data via the respective host application(s). In the example above, block 720 comprises examining input received via interface 612-1, which includes data from first controller 94. Again, it is to be noted that the monitoring of first controller 94 is passive—no changes to first controller 94 are required—and that built-in monitoring functions of first controller 94 are utilized. The data from first controller 94 can thus include information from temperature sensors TS1 to TS8, or information as to whether or not heat transfer unit 86-1 or 86-2 are activated.

Block 725 comprises receiving energy demand data via the respective host application(s). In the example above, block 725 comprises examining input received via interface 612-2, which includes data from temperature sensor TS9. Again, it is to be noted that the monitoring of temperature sensor TS9 is passive—no changes to temperature sensor TS9 or second controller 112 are required. The data from temperature sensor TS9 can thus indicate whether or not a threshold lower temperature has been reached that would normally cause second controller 112 to activate heater 100. Host application 628 can, if desired, be configured with the operational parameters of second controller 112 so that master control application 624 can anticipate the operation of second controller 112 according to the input from temperature sensor TS9.

Block 730 comprises determining whether an energy transfer criteria has been met. A "yes" determination would be reached at block 730 where, for example, master control application 624 ascertains that one or more heat transfer unit 86-1 or 86-2 are activated AND where temperature sensor TS9 has fallen below the threshold lower temperature that causes activation of heater 100. Other ways of reaching a "yes" determination will now occur to those skilled. Conversely a "no" determination would be reached at block 730 where, for example, master control application 624 ascertains that no heat transfer units such as 86-1 or 86-2 are activated.

On a "yes" determination from block 730 method 700 advances to block 735, at which point a determination is made as to whether the energy transfer unit 204 is capable of meeting the demand that lead to the "yes" determination at block 730. A "no" determination can be made at block 735 where, for example, a diagnostic exercise reveals that energy transfer unit 204 is in need of a repair or some other fault detection is made. A "no" determination can be made at block 735 where, for example, a diagnostic exercise reveals that even if energy transfer unit 204 is activated, the level of energy required to operate energy transfer unit 204 would not result in any overall net energy savings in system 50a. A "no" determination can also be made at block 735 where, for example, a diagnostic exercise reveals that the particular energy demand and supply profiles receive via interfaces 612 will likely lead to the aforementioned "starvation" or "flooding" issues that can occur in the specific, but purely exemplary embodiment of energy transfer unit 204 as described above.

Where a "no" determination is made at block 730, or at block 735, then method 700 advances to block 740 and energy exchange unit 204 will be deactivated (or will remain inactive if it is already inactive). Method 700 then cycles back from block 740 to block 715.

Returning again to block 735, a "yes" determination can be made where, for example, the gap between energy supply and energy demand is so great that even where energy transfer unit 204 operates inefficiently, there will still be a net reduction in the amount of energy consumed by heater 100 that more than offsets the energy consumed by energy transfer unit 204. Those skilled in the art will now recognize that less cautious criteria can be used to reach a "yes" determination at block 735.

A "yes" determination at block 735 leads method 700 to block 745. Block 745 comprises controlling the energy transfer unit. In the specific example above, block 745 can include invocation of method 400 or method 500, including the variations thereon, so as to heat water for water tank 104. Other means of controlling the energy transfer unit will now occur to those skilled in the art.

Block 750 comprises monitoring the operation energy transfer unit, to detect faults or any aspects of its operation.

While not required, it is generally contemplated that method 700 can comprise heuristic or artificial intelligence algorithms, whereby determinations at block 730 and block 735, and control parameters used at block 745, can change based on historic monitoring at block 750 (including historic data from block 720 and block 725) so that during subsequent cycling of method 700, the activation, or deactivation, or control over energy transfer unit 204 will change so as to provide the most efficient energy savings profile.

Variants on the foregoing are contemplated. For example, in addition to temperature sensors, other environmental sensors can be added, including sensor for barometric pressure, wind speed, rain fall and the like. As another example, further inputs can be provided to controller 208, such as a market-feed of daily energy prices—such as electricity costs for the cooling subsystem or natural gas prices for operating heater 100. Those daily energy price inputs can be further used as part of the determinations made at block 730 or block 735. As another example, first valve 212, second valve 216, third valve 220 and fourth valve 224 can be selectively opened, completely or partially, or closed completely, by remote control from CPU 600 via another control interface (not shown) so as to provide further control over system 50a. In this manner, controller 208 can completely remove itself from system 50a so that system 50a will operate in substantially the same manner as system 50. Various advantages are contemplated by the teachings herein. For example, as has been noted the incorporation of energy transfer units such as energy transfer unit 204 has been virtually non-existent, despite the basic concepts of such technology being known. The present teachings permit the transparent, passive, non-intrusive introduction of such energy transfer technology with minimal risk for the operator of a multi-unit structure, as much of the prior art contemplates replacement of existing infrastructure with an energy transfer unit capable of satisfying all air conditioning and hot water needs. As another advantage, pricing for the capital costs of retrofitting system 200 into an existing system 50 can be based on a cost-savings model, whereby the cost of system 200 is recouped as a function of overall savings—again encouraging adoption of system 200 with minimal or no risk to the operator or owner of a particular multi-unit structure.

As a still further variation, it should be understood that controller 208 can be configured to work with a plurality of different types of energy supply, and energy demand, and energy transfer technologies. Furthermore, controller 208 can be configured to work with a plurality of energy transfer units and also provided additional inputs to work with a plurality of energy supply sources (e.g. air conditioners, furnaces, ovens, chimneys) and a plurality of energy demands (e.g. hot water heaters, hot air supply sources). Indeed the present specification can be modified for application to space heating and combined space heating and domestic water heating system. In this manner controller 208 can dynamically route different excess energy sources to different energy demands.

Figure 8:
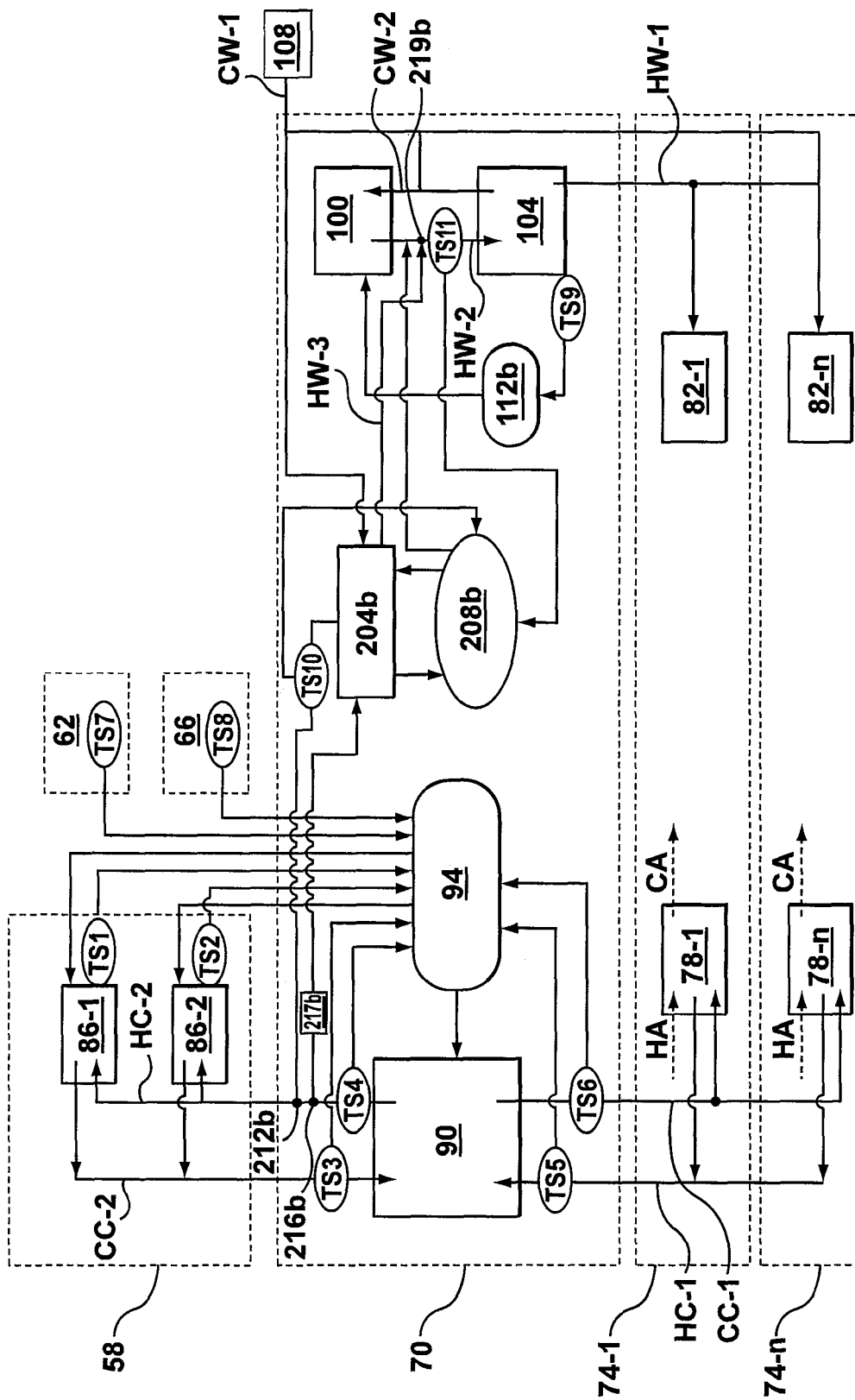
FIG. 8 shows another retrofit system incorporated into a complete air-conditioning system and separate hot water system for a multi-unit structure.

Referring now to FIG. 8, another retrofit system incorporated into a complete air-conditioning system and separate hot water system for a multi-unit structure is indicated generally at 50b. System 50b is a variation on system 50a, and therefore like elements bear like references, although certain elements bear references followed by the suffix "b" to denote particular features of system 50b.

Of note is that in system 50b, first valve 212b is provided for tapping into the hot coolant line carrying hot coolant HC-2. First valve 212b is positioned closer to the heat transfer units 86-1 and 86-2 than central energy exchange unit 90, down-stream from second valve 216b. (In a variation, not shown, second valve 216b may be located downstream from first valve 212b, but this configuration is presently less preferred as it increases the amount of flow in the portion of the existing conduit that lies between the second valve 216b and first valve 212b.)

Also of note is that system 50b comprises a pump 217b. (As will be apparent from further discussion below, pump 217b can be implemented using a flow-restrictor, though presently, this is not preferred.) Pump 217b is positioned on the conduit between second valve 216b and energy exchange unit 204b. Pump 217b is configured to control the flow rate through energy exchange unit 204b.

It can be noted that the conduit between second valve 216b and energy exchange unit 204b can be characterized as having an inlet pressure at second valve 216b, reflecting the pressure of hot coolant HC-2 as it travels to energy exchange unit 204b from second valve 216b. Likewise it can be noted that the conduit between energy exchange unit 204b and first valve 212b can be characterized as having an outlet pressure at first valve 212b, reflecting the pressure of hot coolant HC-2 as it travels to first valve 212b from energy exchange unit 204b and towards heat transfer unit 86-1 or 86-2. Pump 217b is therefore sized so that the inlet pressure at second valve 216b and the outlet pressure at first valve 212b are substantially equal. In this manner, the placement of energy exchange unit 204b is substantially transparent to the regular operation of energy exchange unit 90.

The choice of inlet pressure at valve 216 is generally selected according to the overall height of the building within which system 50b is situated. A person skilled in the art will appreciate that other mechanical means can be provided to achieve the same result as pump 217b, such as a flow restrictor.

In order to help further assure that the outlet pressure from first valve 212b is substantially equal to the inlet pressure at second valve 216b, first valve 212b is preferably physically located near second valve 216b along the conduit that runs between energy exchange unit 90 and heat transfer unit 86-1 or 86-2. For example, where the conduit that runs between energy exchange unit 90 and heat transfer unit 86-1 or 86-2 is about fourteen inches in diameter, and where the conduits running between valves 212b and 216b and energy exchange unit 204b are about six inches in diameter, then valves 212b and 216b may be spaced about two feet apart. This configuration is, however, a non-limiting example. In any event the addition of valves 212b and 216b are effected so as not to disrupt the pre-existing line pressures at those points and thereby not disrupt normal operation of energy exchange unit 90.

At this point it can also be noted that, in system 50b no control signals from first controller 94 are required or received from controller 208b, thereby simplifying system 50b in relation to system 50a, and also further highlighting one of the advantages of the present invention, in that energy exchange unit 204b can be transparently incorporated into an existing system, without requiring material modification to the existing system. System 50b is thus presently configured for environments where the ambient temperature of outdoor area 66 is substantially warm enough such that central energy exchange unit 90 operates substantially constantly, and therefore such continuous operation is presumed by controller 208b. However, it can be noted that system 50b can be implemented in environments where the ambient temperature of outdoor area 66 varies and system 50b will still function, though perhaps less optimally. Where system 50b is implemented in a climate with varying ambient temperature of outdoor area 66, then it can be desired to provide at least one control signal from first controller 94 to controller 208b that indicates whether or not energy exchange unit 90 is operating, so that when energy exchange unit 90 is not operating, then controller 208b would be configured to deactivate energy exchange unit 204b.

System 50b also comprises a temperature sensor TS10 that is located along the outlet conduit that runs between energy exchange unit 204b and first valve 212b. Temperature sensor TS10 provides input to controller 208b. In variations, temperature sensor TS10 could be placed along the inlet conduit that runs between second valve 216 and energy exchange unit 204b, or a temperature sensor could be placed along both conduits.

When temperature sensor TS10 is positioned as shown in FIG. 8, and where temperature sensor TS10 falls below a particular temperature, then controller 208b is configured to deactivate or reduce the current operating capacity of energy exchange unit 204b. When controller 208b is deactivated, then controller 208b may also be configured to maintain (either constantly or periodically) operation of pump 217b and thereby ensure a flow of coolant past temperature sensor TS10 so that readings therefrom are substantially accurate. For example, controller 208b could be configured to periodically activate pump 217b, take a reading from temperature sensor TS10, and then reactive pump 217b. In another embodiment, a temperature sensor may be installed downstream of first valve 212b (not shown), although this may lead to a practically longer cabling run between temperature sensor TS10 and controller 208b, but can obviate the need to periodically cycle pump 217b.

Note, however, if system 50b was configured with another temperature sensor in addition to temperature sensor TS10 (not shown) placed along the inlet conduit that runs between second valve 216b and energy exchange unit 204b, then the temperature difference between those sensors, as well a measurement of the flow rate can provide good indication of the amount of heat transferred from hot coolant HC-2. Note that the flow rate could be assumed where pump 217b is a constant speed pump. For a variable speed pump, the flow rate would be assumed based on the pump control signal from controller 208b.

Thus, once the following energy input conditions are provided: A) the amount of heat transferred from hot coolant HC-2; B) the amount of power consumed by the energy exchange unit 204b (and accounting for or neglecting ambient losses) then the amount of heat being transferring to hot water HW-2 could be determined (due to the fact that energy exchange unit 204b consumes electrical energy to remove thermal energy from hot coolant HC-2) with the sum of these energy inputs being substantially moved to hot water HW-2.

Also of note in system 50b, is that the municipal cold water supply CW-1 is split, with one feed providing an input of municipal cold water to energy exchange unit 204b, and the second feed providing an input of municipal cold water to heating unit 100. Also of note in system 50b is that a hot water return line from hot water demands 82 feeds back into the heating unit 100 or energy exchange unit 204b. By maintaining a flow of hot water HW-1 in a feedback loop, hot water may be provided to all hot water demands 82 quickly. Those skilled in the art will now appreciate that if both heating unit 100 and energy exchange unit 204b are active, municipal cold water supply CW-1 is directed to energy exchange unit 204b and the hot water return line from hot water demands 82 is preferentially directed to heating unit 100.

System 50b also comprises a three-way valve 219b positioned at the input to tank 104. Three-way valve 219b is configured to selectively receive hot water input from energy exchange unit 204b or heating unit 100. A temperature sensor TS11 is also located between three-way valve 219b and the input of tank 104. Three-way valve 219b is under the control of controller 208b, so that controller 208b can selectively direct hot water from either heating unit 100 or energy exchange unit 208b into tank 104.

When three-way valve 219b is positioned to direct hot water from energy exchange unit 204b into tank 104, then controller 208b is configured to monitor the temperature of temperature sensor TS11. In the event that the temperature detected in temperature sensor TS11 falls below a certain threshold of about 120° F., then controller 208b activates three-way valve 219b so as to direct hot water from heating unit 100 into tank 104, and thereby shutting off flow of hot water from energy exchange unit 204b to tank 104.

Controller 208b may also be configured to monitor temperatures detected at temperature sensor TS10 during times when the threshold temperature at temperature sensor TS11 is reached such that controller 208b reaches the decision to direct water from heating unit 100 into tank 104. In this manner, based on the historical temperatures detected at temperature sensor TS10 and temperature sensor TS11, controller 208b can increase its ability to reliably predict which temperatures at temperature sensor TS10 are sufficient to provide a desired level of heating to municipal cold water supply 108.

Other criteria may also be used to determine when to activate three-way valve 219b. For example, where the heat source for heating unit 100 uses a fuel that is ultimately cheaper than the cost of electricity used to operate energy exchange unit 204b, then three-way valve 219b may be set to direct hot water from heating unit 100 to tank 104, even though there may be sufficient energy for energy exchange unit 204b to satisfy the hot water demand.

It is also contemplated that valve 219b can be variable, so that a first portion of hot water is directed from heating unit 100 into tank 104, and a second portion of hot water is directed from energy exchange unit 204b. Where such a variable three-way valve 219b is provided, energy exchange unit 204b offloads some of the carbon-intensive resources required to heat water using heating unit 100 onto energy exchange unit 204b, while recognizing that energy exchange unit 204b may not be able to satisfy the entire hot water demand of system 50b.

In a variation to system 50b where valve 219b is variable, an additional temperature sensor (not shown), either in addition to, or instead of temperature sensor TS11, can also be positioned between energy exchange unit 204b and three-way valve 219b. Such an additional temperature sensor can also be used to provide input to controller 204b to provide further input for determining when three-way valve 219b should be adjusted to direct hot water from energy exchange unit 204b into tank 104.

In another variation to system 50b, three-way valve 219b may be omitted and a conduit can be provided to connect the hot water outlet of energy exchange unit 204b to a water input of heating unit 100. In this manner, energy exchange unit 204b acts as a pre-heater for heating unit 100. This variation can be desired to further simplify a retro-fit installation of energy exchange unit 204b.

Those skilled in the art will now appreciate that method 700 can also be modified to operate system 50b or its variants. As noted above, block 705 comprises determining input types. When applying block 705 to system 50b, controller 208b performs an initialization sequence to determine which types of inputs are connected to controller 208b. In the specific, but non-limiting example of FIG. 8, controller 208b receives inputs from temperature sensor TS10 and temperature sensor TS11.

Referring back to FIG. 7, block 710 comprises loading applications based on the inputs detected at block 705. As previously described, block 710 thus comprises loading appropriate host applications and driver applications from application database 634 to thereby provide software interfaces to the connected controllers or temperature sensors. When applying block 710 to the example in FIG. 8, then master control application 624 will be configured to monitor the inputs in relation to temperature sensor TS10 and temperature sensor TS11.

Again, as desired, controller 208b can be configured to either have fixed expectations as to the locations and functions of temperature sensor TS10 and temperature sensor TS11 within system 50b, or controller 208b may be manually configured as part of an initialization process as to the locations and functions of temperature sensor TS10 and temperature sensor TS11.

Block 715 comprises determining whether there have been any changes to the input types. Again, block 715 verifies that changes have been made since the detection at block 705, and if such a change is detected, then method 700 cycles back to block 705. If no change is detected then method 700 advances to block 720. Accordingly, if additional temperature sensors (not shown in FIG. 8) or other types of inputs that can be provided to controller 208b are provided, then block 705 and block 710 can be repeated to accommodate.

Note that block 705 and block 710 can also be modified to accommodate the various types of output controls that controller 208b may be configured to access. For example, in FIG. 8, controller 208b may be configured with applications and drivers to issue output commands that control three-way valve 219b, or pump 217b, or both of them.

Block 720 comprises receiving energy supply data via the respective host application(s). In the example for system 50b, block 720 comprises examining input received via temperature sensor TS10 and temperature sensor TS11. Again, it is to be noted that the monitoring is passive—no changes to the existing air conditioning or water heating systems are required.

Block 725 comprises receiving energy demand data via the respective host application(s). In the example above, demand is presumed to exist. (However, optionally, not shown, temperature sensor TS9 may also be connected to provide input to controller 208b, and thus the reaching of a lower threshold temperature may be used to determine that a demand exists).

Block 730 comprises determining whether an energy transfer criteria has been met. A "yes" determination would be reached at block 730 where, for example, controller 208b determines that an upper threshold temperature of temperature sensor TS10 has been reached, indicating that an excess of energy supply is available from energy exchange unit 90 that can be used to satisfy hot water demands 82. Conversely a "no" determination would be reached at block 730 where, for example, controller 208b ascertains that a lower threshold temperature of temperature sensor TS10 has been reached.

On a "yes" determination from block 730 method 700 advances to block 735, at which point a determination is made as to whether the energy transfer unit 204 is capable of meeting the demand that lead to the "yes" determination at block 730. A "no" determination can be made at block 735 where, for example, a diagnostic exercise reveals that energy transfer unit 204b is in need of a repair or some other fault detection is made. A "no" determination can be made at block 735 where, for example, a diagnostic exercise reveals that even if energy transfer unit 204b is activated, the level of energy required to operate energy transfer unit 204b would not result in any overall net energy savings in system 200a. A "no" determination can also be made at block 735 where, for example, a diagnostic exercise reveals that the particular energy demand and supply profiles will likely lead to the aforementioned "starvation" or "flooding" issues that can occur in the specific, but purely exemplary embodiment of energy transfer unit 204b as described above.

Where a "no" determination is made at block 730, or at block 735, then method 700 advances to block 740 and energy exchange unit 204b will be deactivated (or will remain inactive if it is already inactive). Likewise block 740 may comprise activation of three-way valve 219b so as to direct hot water from heating unit 100 into tank 104. Method 700 then cycles back from block 740 to block 715.

Note that, according to one of the advantages of this specification, the reaching of a "no" determination at block 730 need not have any impact on either the pre-existing air conditioning or hot water systems.

Returning again to block 735, a "yes" determination can be made where, for example, the gap between energy supply and energy demand is so great that even where energy transfer unit 204b operates inefficiently, there will still be a net reduction in the amount of energy consumed by heater 100 that more than offsets the energy consumed by energy transfer unit 204b. In optimal and typical conditions, it would normally be expected that a "yes" determination would be reached at block 735. Indeed, those skilled in the art will now recognize that less cautious criteria can be used to reach a "yes" determination at block 735.

A "yes" determination at block 735 leads method 700 to block 745. Block 745 comprises controlling the energy transfer unit 204b. Block 745 can include, by way of non-limiting example, activation of three-way valve 219b so as to direct hot water from energy exchange unit 204b into tank 104, and additionally invoking method 400 or method 500, or variations thereon, so as to provide hot water for water tank 104. Other means of controlling the energy transfer unit will now occur to those skilled in the art.

Block 750 comprises monitoring the operation energy transfer unit, to detect faults or any aspects of its operation. While not required, it is generally contemplated that method 700 can comprise heuristic or artificial intelligence algorithms, whereby determinations at block 730 and block 735, and control parameters used at block 745, can change based on historic monitoring at block 750 (including historic data from block 720 and block 725) so that during subsequent cycling of method 700, the activation, or deactivation, or control over energy transfer unit 204b will change so as to provide the most efficient energy savings profile.

Further variations, combinations, and subsets of the foregoing are contemplated. Indeed, aspects of system 50a can be incorporated into system 50b, and vice versa. For example, the hot water feedback loop of system 50b that provides instant hot water to demands 82 can also be incorporated into system 50a. As another example, it should be understood that a single controller can be developed that includes the functionality of both controller 208 and controller 208b to provide an even further flexible retrofit energy exchange system.

As another example variation, energy exchange unit 204*b* can be configured to tap into hot coolant line HC-1, to thereby pre-cool coolant before it enters energy exchange unit 90.

Figure 9:
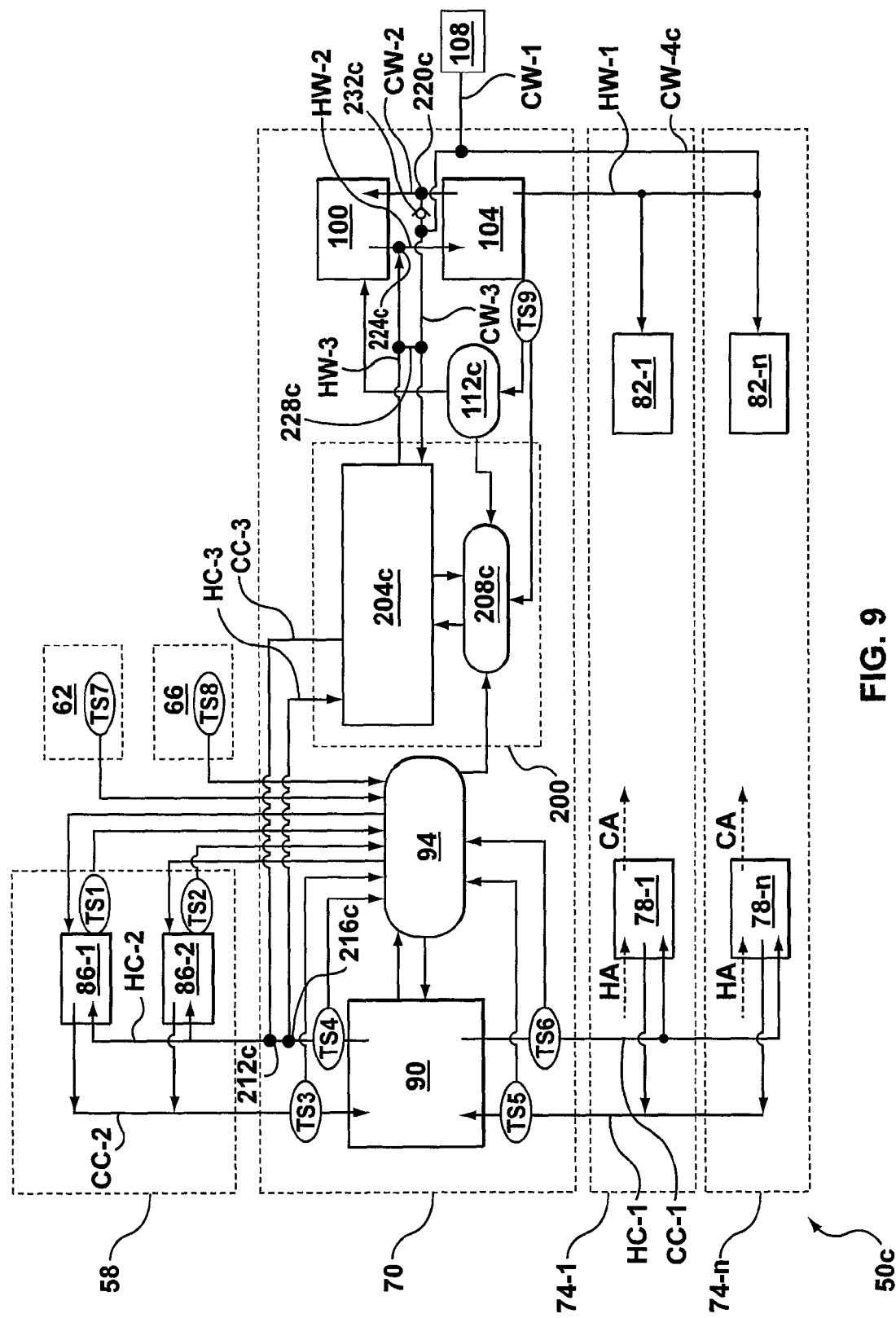
FIG. 9 shows another retrofit system incorporated into a complete air-conditioning system and separate hot water system for a multi-unit structure.

Referring now to FIG. 9, another retrofit system incorporated into a complete air-conditioning system and separate hot water system for a multi-unit structure is indicated generally at 50*c*. System 50*c* is a variation on system 50*a*, and therefore like elements bear like references, although certain elements bear references followed by the suffix "c" to denote particular features of system 50*c*. System 50*c* may be desired to recognize that energy exchange unit 204*c* can operate more efficiently by heating cold inlet water rather than warm water, as less electricity is required to transfer the same amount of heat from hot coolant line HC-3.

System 50*c* can be generally described as comprising two pipe heat recovery with inlet CW-1 preferentially directed to energy exchange unit 204*c* before entering tank 104. Inlet CW-1 directs water towards energy exchange unit 204*c* via line CW-3. Also valve 228*c* joins line HW-3 with line CW-3. When energy exchange unit 204*c* is deactivated, then valve 228*c* can be opened under the control of controller 208 allowing cold water CW-1 to flow directly into storage tank 104. Note, however, if the pressure drop through energy exchange unit 204*c* is acceptable even though energy exchange unit 204*c* is deactivated, then valve 228*c* can be eliminated.

A check-valve 232*c* prevents back flow of cold water from line CW-1 into heater 100 or tank 104. By the same token, water from line CW-2 can overcome the check valve 232*c* and flow into energy exchange unit 204*c*.

An optional, though presently preferred, recirculation line CW-4*c* is provided from suites 74 and back to line CW-3. Recirculation line return CW-4*c* can be also piped directly into tank 104, or as shown to directly join with line CW-1.

Cold water line CW-3 contains a mixture of water from cold water line CW-1 and cold water line CW-2. During relatively low demand, water line CW-3 will be warm, and during higher demand water in line CW-3 will be colder.

Second controller 112*c* may be a dual set-point aquastat responsive to data received from temperature sensor TS9. The use of such a second controller 112*c* is contemplated in system 50*c*. In system 50*c*, the wiring of second controller 112*c* is configured so that energy exchange unit 204*c* is activated when the temperature from sensor TS9 falls below the upper threshold (e.g. about 140° F.), and heater 100 is activated when the temperature from sensor TS9 falls below the lower threshold (e.g. about 120° F.), such that only when sensed temperature of sensor TS9 falls below the lower threshold are both energy exchange unit 204*c* and heater 100 activated. Control outputs from second controller 112*c* indicating the upper threshold thus provide input to controller 208*c* and thereby activate energy exchange unit 204*c*, while control outputs from second controller 112*c* indicating the lower threshold thus provide inputs to heater 100 to activate heater 100.

Figure 10:
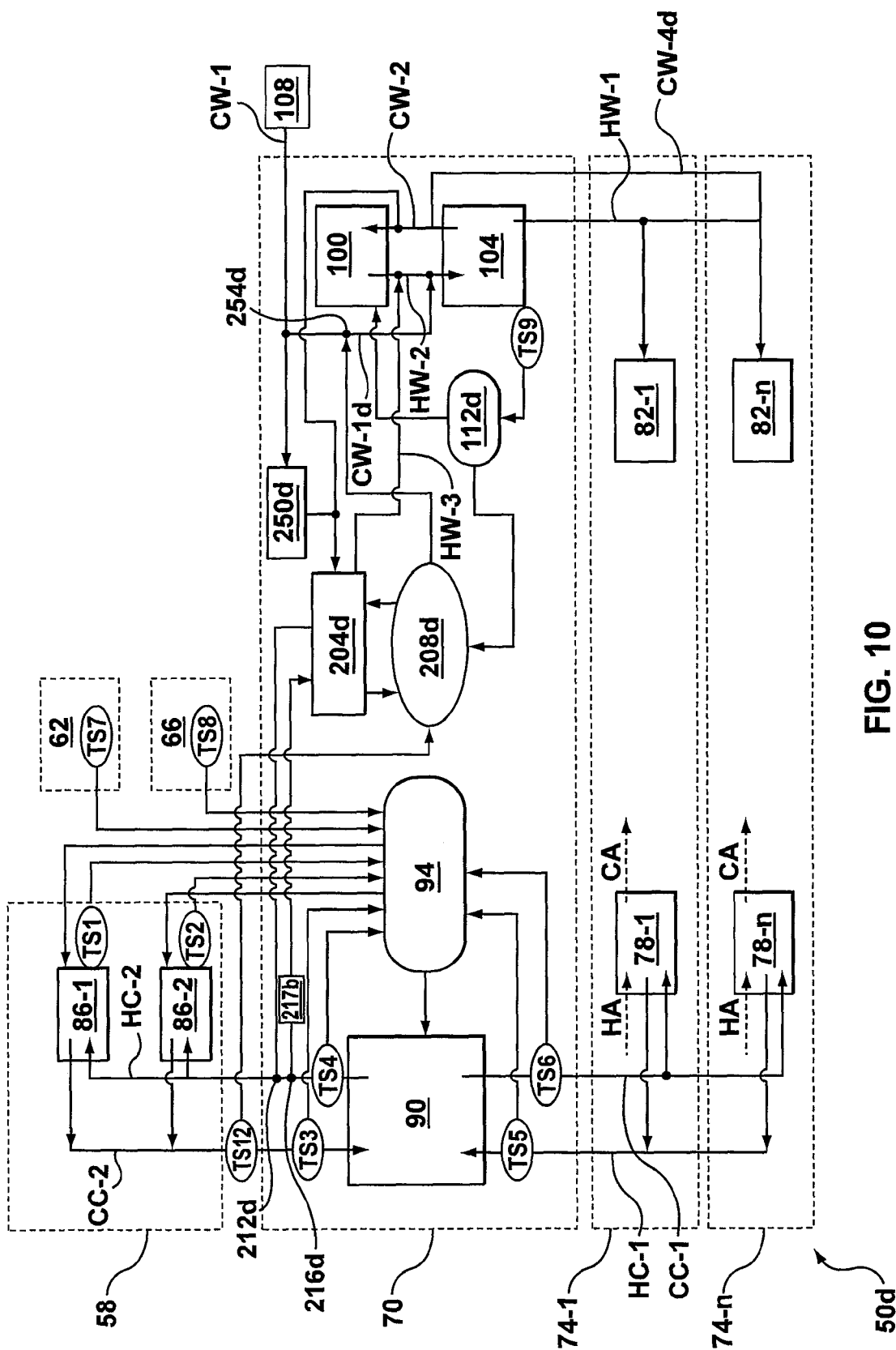
FIG. 10 shows another retrofit system incorporated into a complete air-conditioning system and separate hot water system for a multi-unit structure.

Referring now to FIG. 10, another retrofit system incorporated into a complete air-conditioning system and separate hot water system for a multi-unit structure is indicated generally at 50*d*. System 50*d* is a variation on system 50*a* and system 50*b*, and therefore like elements bear like references, although certain elements bear references followed by the suffix "d" to denote particular features of system 50*d*. System 50*d* can be generally described as a heat recovery system that preferentially directs municipal water CW-1 towards energy exchange unit 204*d* before entering tank 104.

System 50*d* also comprises a temperature sensor TS12 that is connected to the cold coolant line to sense the temperature of cold coolant CC-2. Temperature sensor TS12 provides input to controller 208*d*. When temperature sensor TS12 falls below a particular temperature, controller 208*d* is configured to deactivate or reduce the current operating capacity of energy exchange unit 204*d*. It will be appreciated by a person skilled in art that placing temperature sensor TS12 on the cold coolant line will be advantageous for accurately measuring the temperature of cold coolant CC-2 entering the central energy exchange unit 90.

Of note is that energy exchange unit 204*d* can optionally include a sub-cooler, which is separately shown in FIG. 10 as sub-cooler 250*d*, which is configured to transfer a portion of excess energy from central energy exchange unit 90 as described above. Municipal cold water CW-1 is directed initially to sub-cooler 250*d*, and then exits therefrom and enters the main portion of energy exchange unit 204*d* as described above.

In addition, cold water CW-2 circulating out of tank 104 is split into two lines, with one line entering heater 100 and the second line directed back into energy exchange unit 204*d*.

Municipal cold water CW-1 can also be directed into tank 104 via the path labeled cold water CW-1*d* by the selective activation of a solenoid valve 254*d* that is under the control of controller 208*d*. Solenoid valve 254*d* can also be deactivated so that all municipal cold water CW-1 is directed towards energy exchange unit 204*d*.

In system 50*d*, water from hot water line HW-1 is re-circulated back to cold water line CW-2 via cold water line CW-4*d*. As is the case with the other embodiments discussed herein, it should be understood that such a recirculation line is optional and its presence depends on the existing hot water infrastructure since controller 208*d* and energy exchange unit 204*d* are configured to retrofit into such an existing hot water infrastructure. However, when such a recirculation line is provided, choices can be made where it connected back into the hot water system components as those components are located within mechanical room 70.

Figure 11:
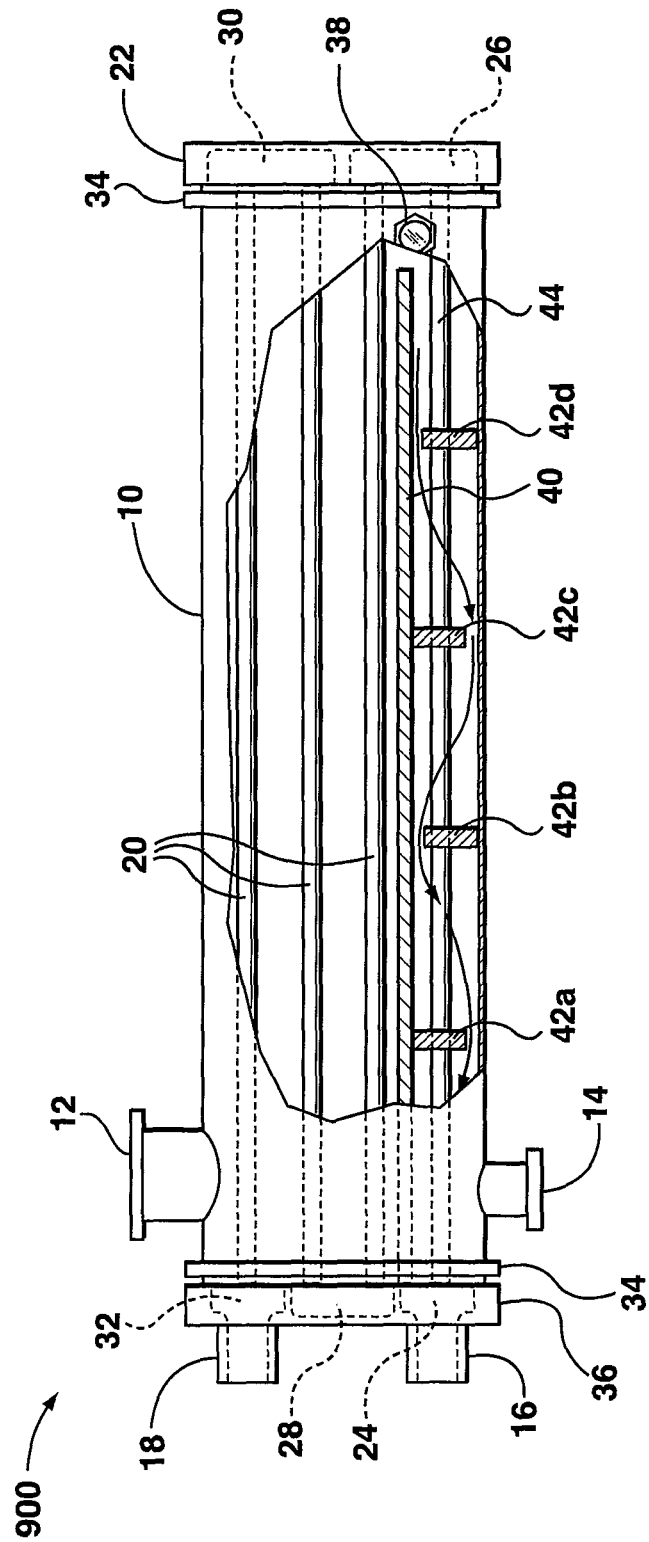
FIG. 11 shows an exemplary condenser with subcooling, according to non-limiting embodiments.

Referring to FIG. 11, a shell and tube condenser 900 with integral subcooling according to a non-limiting embodiment is generally shown. Shell and tube condenser 900 is also referred to as condenser 900 hereafter. In some embodiments, energy exchange unit 204, 204*b*, 204*c*, or 204*d* may comprise condenser 900. However, it is appreciated that use of condenser 900 is not limited, and that condenser 900 can be used in any suitable system where heat exchange and/or subcooling is desired.

A fluid inlet 16 is provided in a connection header 36 for entry of a liquid medium, such as water, glycol, or the like to be heated. The liquid medium proceeds to an inlet compartment 24 where the liquid medium is distributed to at least one first pass tube 44, located near the bottom of a shell 10 of condenser 900. The liquid medium travels down at least one first pass tube 44 to a compartment 26 which is located in a plain header 22 and connects to a plurality of tubes 20 (also referred to as tubes 20), and specifically the lowest set of tubes of the plurality of tubes 20 (though above at least one first pass tube 44). The lowest tubes terminate in compartment 28. The liquid medium then travels through the next highest set of tubes of the plurality of tubes 20 to compartment 30 and back down the highest set of tubes of the plurality of tubes 20 to compartment 32. As the liquid medium travels through each set of tubes of the plurality of tubes 20 up through condenser 900, the liquid medium is heated by the condensing of a refrigerant as described below. A fluid outlet 18 is provided in connection header 36 for exit of the liquid medium after it has been heated. Tubesheets 34 are provided at either end for securing the ends of tubes 20 and 44.

It is appreciated that a pass of liquid medium between header 22 and header 36 can be referred to as a "pass" through condenser 900. Hence, at least one first pass tube 44 can be referred as first pass tube 44. Further, it is appreciated that there are four passes through condenser 900 and hence condenser 900 can also be referred to as a four pass condenser and/or a condenser with an even number of passes. Hence, liquid medium enters and exits condenser 900 from the same side via header 36. In a condenser with an odd number of passes, the liquid medium enters and exits from opposite sides. Both even and odd pass condensers are within the scope of present embodiments. Additionally, while only one first pass tube 44 is depicted, it is appreciated that condenser 900 can comprise any suitable number of first pass tubes. Further, condenser 900 can comprise any suitable number of tubes 20 for each successive pass.

A refrigerant inlet 12 is provided in a top of shell 10 for entry of refrigerant in a vapour state from a compressor discharge (e.g. compressor 320). While inlet 12 is depicted adjacent connection header 36, it is appreciated that the location of inlet 12 is not particularly limiting. For example, in another embodiment (not shown), an inlet can be located substantially midway between connection header and plain header. In yet another embodiment (also not shown), an inlet can be located towards header. Inside shell 10, the refrigerant contacts tubes 20 where sensible heat and then latent heat is removed from the refrigerant causing the refrigerant to condense into a liquid state. It is appreciated that tubes 20 carry the liquid medium that enters condenser via first pass tube 44 near the bottom of condenser 900, and thereafter flows through tubes 20 exchanging heat with a refrigerant on each pass through condenser 900. It is further appreciated that refrigerant enters shell 10 in a vapour state and initially transfers sensible heat and then latent heat to tubes 20. The refrigerant condenses on tubes 20 to form liquid refrigerant.

After condensing, the liquid refrigerant falls off tubes 20 and collects on a divider 40 located towards a bottom of shell 10, and above at least one first pass tube 44. Indeed, it is appreciated that divider 40 is located between at least one first pass tube 44 and second pass tubes (i.e. the lowest of tubes 20). Divider 40 is enabled to direct the liquid refrigerant towards a plain header 22 of condenser 900, divider 40 extending towards header 22 with a gap there between of any suitable size allowing the liquid refrigerant to fall to the bottom of shell 10 and onto at least one tube 44. Alternatively, one or more holes are provided in divider 40 for the liquid refrigerant to pour there through. Divider 40 is generally parallel to the bottom of shell 10 and a height difference of liquid refrigerant from connection header 36 to plain header 22 causes the liquid refrigerant to flow towards plain header 22. It is appreciated that the height difference occurs due to the flow of liquid refrigerant as it falls onto at least one tube 44. In another embodiment (not shown), a divider may be sloped at an angle for directing liquid refrigerant towards a header.

Referring to FIG. 11, divider 40 is rectangular in cross section (e.g. flat). However, in another embodiment, the divider can comprise any suitable number of channels of any suitable shape to aid the liquid refrigerant flow towards header 22. It is appreciated that divider 40 comprises dimensions that enable divider to fill the space between the sides of shell 10. Divider 40 extends to both sides of shell 10 as well as tubesheet 34 adjacent connection header 36. In other embodiments, the divider may also extend to tubesheet 34 adjacent plain header 22, however in these embodiments, the divider includes at least one aperture proximate to plain header 22 for liquid refrigerant to flow onto at least one first pass tube 44.

It is appreciated that in embodiment shown in FIG. 11, divider 40 directs liquid refrigerant towards plain header 22. In general, it is appreciated that divider 40 directs liquid refrigerant away from a refrigerant outlet 14 such that when the liquid refrigerant is flowing across first pass tube 44, the liquid refrigerant is flowing towards outlet 14.

A plurality of baffle plates 42-42a, 42b, 42c, and 42d (collectively baffles 42 and generically a baffle 42) are located between divider 40 and the bottom of shell 10. Baffles 42 are enabled to route the liquid refrigerant along the bottom of shell 10. It is appreciated that a first baffle 42a extends from divider 40 towards the bottom of shell 10, leaving a gap between the end of baffle 42a and the bottom of shell 10. A second baffle 42b extends from the bottom of shell 10 towards divider 40, leaving a gap between the end of baffle 42b and divider 40. Baffle 42c is similar to baffle 42a and baffle 42d is similar to baffle 42b. Hence, baffles 42 alternate between extending from divider 40 towards the bottom of shell 10 and extending up from the bottom of shell 10 towards divider 40. It is appreciated that while four baffles are depicted in FIG. 10, other embodiments may comprise any suitable number of baffles, including at least one baffle. It is further appreciated that the shape of baffles 42 is generally non-limiting, though in some embodiments, baffles are complementary to the shape of divider and/or shell. In addition, it is appreciated that, first pass tube 44 passes through baffles 42, for example, through suitable aperture in each of baffles (not shown).

Baffles 42 are generally enabled to cause liquid refrigerant to flow around at least on first pass tube 44, and reduce the cross sectional area of the flow of the liquid refrigerant around at least one first pass tube 44, thereby increasing the velocity of the liquid refrigerant such that heat (e.g. sensible heat) is removed from the liquid refrigerant, subcooling the liquid refrigerant and heating the liquid medium in at least one first pass tube 44. For example, it is appreciated that increasing the velocity of a liquid refrigerant results in an increase in the liquid refrigerant's heat transfer coefficient. Hence, by increasing the velocity of the liquid refrigerant with baffles 42, the flow of sensible heat from the liquid refrigerant to the liquid medium in first pass tube 44 becomes more efficient.

Figure 12:
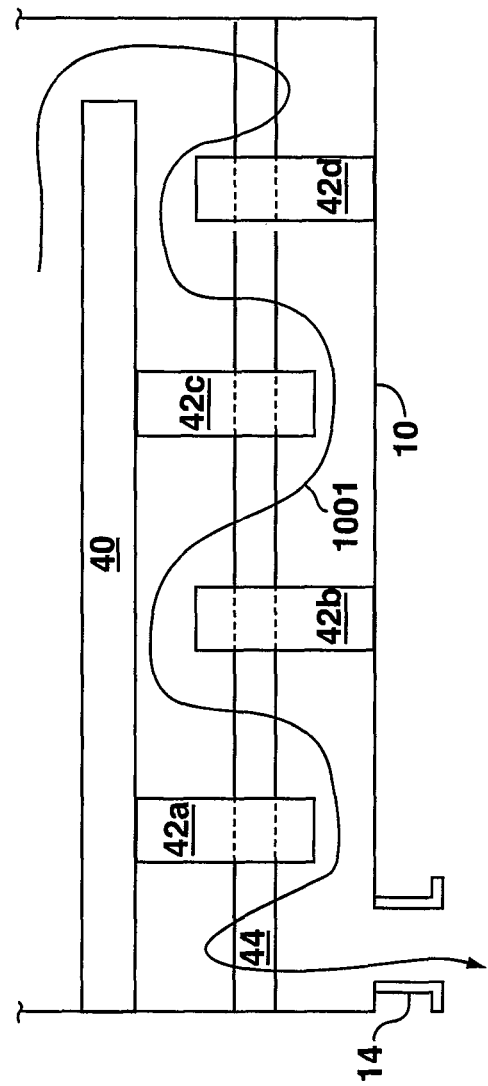
FIG. 12 shows a path of liquid refrigerant around baffles in the condenser of FIG. 11.

Referring to FIG. 12, a schematic diagram of a subset of features of condenser 900, including a portion of shell 10, divider 40, baffles 42, at least one first pass tube 44, divider 40 and outlet 14 is shown. It is appreciated that while other elements of condenser 900 are not depicted in FIG. 10, the other elements are nonetheless present in condenser 900 (e.g. plain header 22). In any event, it is appreciated from FIG. 10 that baffles 42a, 42b, 42c, and 42d alternately extend from divider 40 and the bottom of shell 10 resulting in a path 1001 for liquid refrigerant around baffles 42. It is further appreciated that path 1001 is longer than a path along a longitudinal axis of condenser 900 in the absence of baffles 42. Furthermore, baffles 42 also result in a smaller cross-sectional area of path 1001 as compared to a path along a longitudinal axis of condenser 900. The smaller cross-sectional area of path 1001 causes the velocity of the liquid refrigerant to increase, which in turn leads to an increase in the liquid refrigerant's heat transfer coefficient, improving the heat transfer efficiency between the liquid refrigerant and the liquid medium in first pass tube 44 over a similar condenser without baffles 42. This in turn leads to an improvement in the subcooling of condenser 900. Further, the longer length of path 1001 increases interaction between the liquid refrigerant and first pass tube 44, which further improves the efficiency of subcooling in condenser 900.

Figure 13:
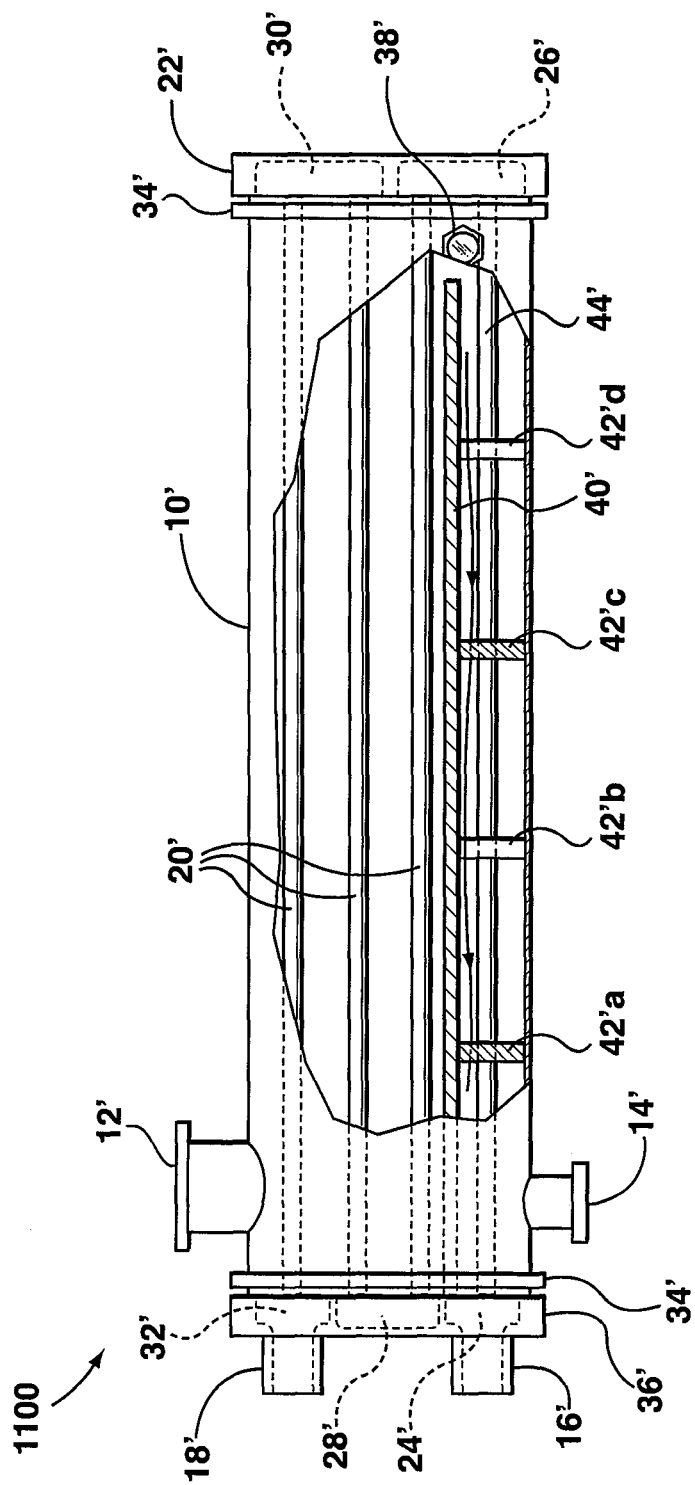
FIG. 13 shows another exemplary condenser with subcooling, according to non-limiting embodiments.

Referring now to FIG. 13, a condenser 1100 similar to condenser 900 is shown with like elements having like numbers, however with a prime mark appended thereto. For example, divider 40' is similar to divider 40. Condenser 1100 comprises baffles 42'a, 42'b, 42'b, and 42'd (collectively baffles 42' and generically a baffle 42'). However, baffles 42' extend under divider 40' from one side of shell 10' to an opposite side of shell 10', substantially along a transverse axis of shell 10' (and/or divider 40'). For example, each baffle 42' is substantially perpendicular to a longitudinal axis of shell 10' (and/or divider 40').

Figure 14:
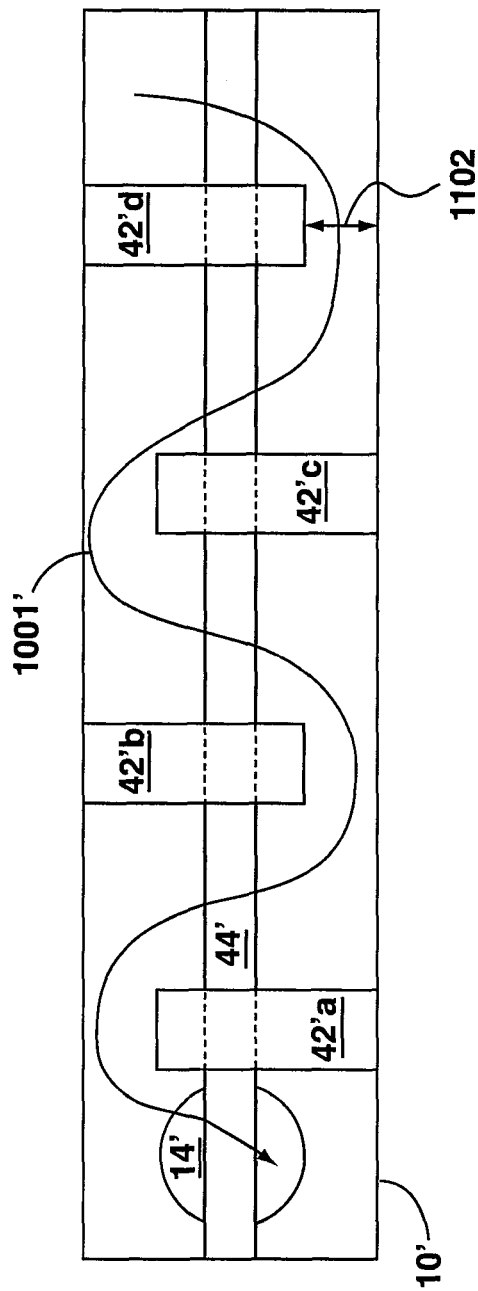
FIG. 14 shows a path of liquid refrigerant around baffles in the condenser of FIG. 13.

Referring to FIG. 14, liquid refrigerant follows a path 1001' around baffles 42' and out of outlet 14'. Similar to baffles 42, baffles 42' are generally enabled to cause liquid refrigerant to flow around at least on first pass tube 44', and reduce the cross sectional area of the flow of the liquid refrigerant around at least one first pass tube 44', thereby increasing the velocity of the liquid refrigerant such that heat (e.g. sensible heat) is removed from the liquid refrigerant, subcooling the liquid refrigerant and heating the liquid medium in at least one first pass tube 44'. For example, it is appreciated that increasing the velocity of a liquid refrigerant results in an increase in the liquid refrigerant's heat transfer coefficient. Hence, by increasing the velocity of the liquid refrigerant with baffles 42', the flow of sensible heat from the liquid refrigerant to the liquid medium in first pass tube 44' becomes more efficient. In any event, it is appreciated that the cross-sectional area of path 1001' is smaller than the cross-sectional area of the path of liquid refrigerant in the absence of baffles 42'.

Figure 15:
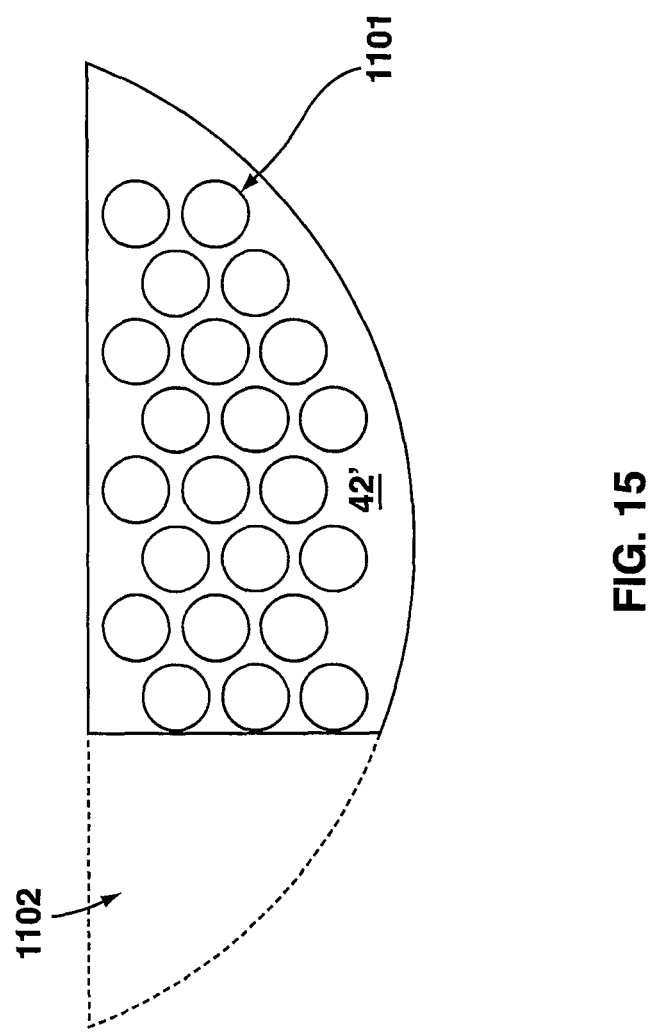
FIG. 15 shows a perspective view of a baffle of the condenser of FIG. 13, according to non-limiting embodiments.

Referring to FIG. 15, a perspective view baffle 42' is shown. Baffle 42' is appreciated to be substantially complementary to a shape of the bottom of shell 10, and is further enabled to extend from divider 40 to the bottom of shell 10, with the exception of a baffle "window" 1102 through which the liquid refrigerant can flow. Baffle 42' further comprises at least one aperture 1101 through which at least one first pass tubes 44 can pass. As depicted in FIG. 15, baffle 42' comprises 22 apertures such that 22 first pass tubes can pass there through. It is appreciated that the number of apertures 1101 is preferably matched to the number of first pass tubes 44.

Returning now to FIG. 11, refrigerant outlet 14 connects condenser 900 to an expansion control device (not shown) within a vapour compression cycle, for example expansion valve 332. The expansion control device can compensate for any pressure drop penalty introduced by increasing the velocity of the liquid refrigerant. Furthermore, the amount of refrigerant in condenser 900 is controlled such that the liquid refrigerant level is matched to divider 40. Shell 10 comprises an optional window 38 (e.g. a sight glass) at the level of divider 40 such that the height of the liquid refrigerant can be visually confirmed. In other words, window 38 can be used to confirm that condenser 900 contains the correct amount of refrigerant. When condenser 900 does not contain the correct amount of refrigerant, corrective action can be taken to increase or decrease the amount of refrigerant in condenser 900.

Figure 16:
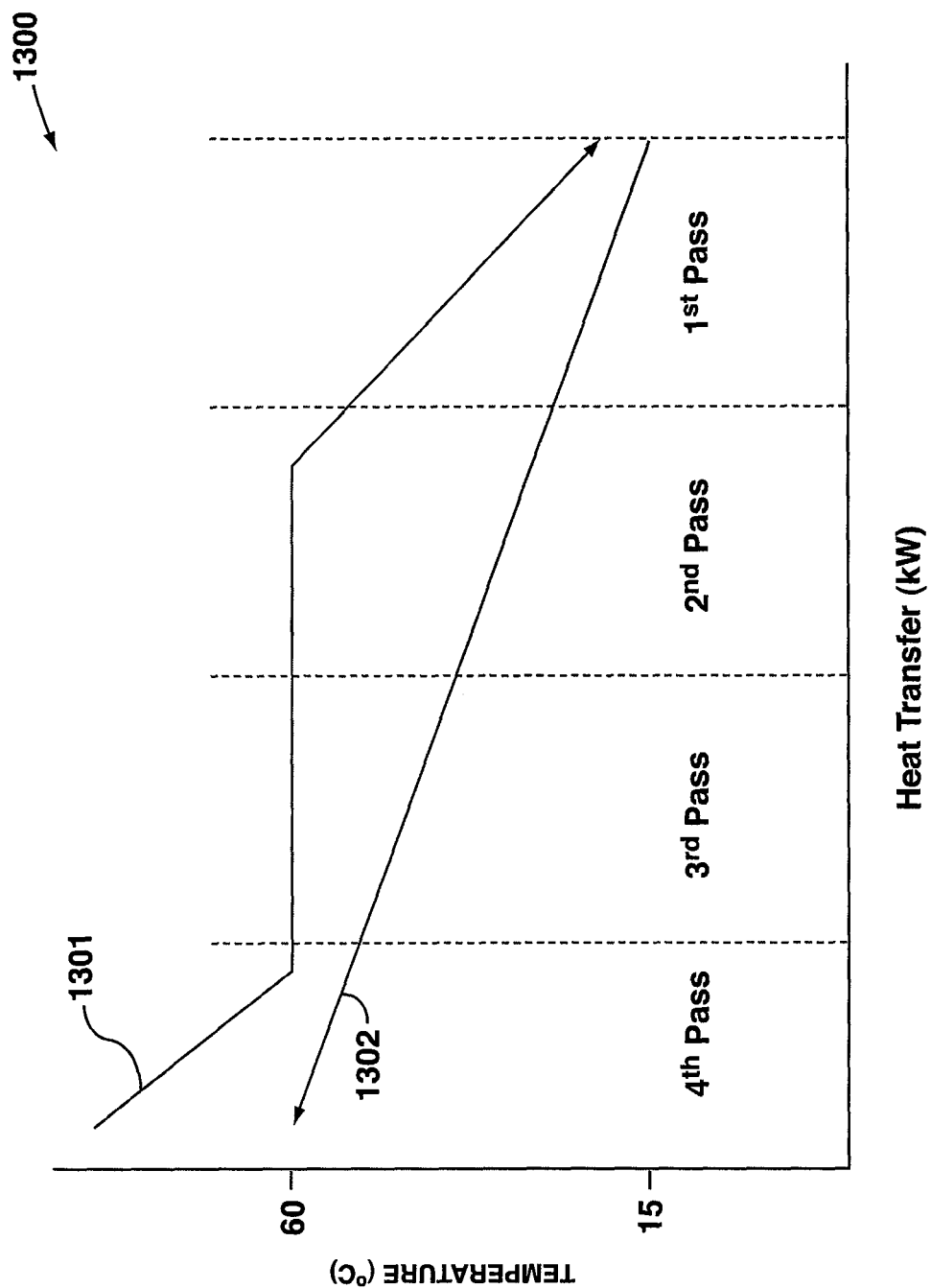
FIG. 16 shows a cooling curve for at least one of the condenser of FIG. 11 and the condenser of FIG. 13.

Referring to FIG. 16, a graph showing a cooling curve 1301 for the refrigerant as it enters and condenses in a condenser such as condenser 900 or condenser 1100 and a heating curve 1302 for the liquid medium as it flows through the condenser is shown generally at 1300. The arrows on each of curves 1301, 1302 indicate the direction of flow through the condenser. For example, liquid medium enters condenser on a first pass through at least one tube 44, and is heated by the condensing refrigerant on subsequent passes. Curve 1302 represents an idealized and/or average of heating of the liquid medium in the condenser. The liquid medium (e.g. water), enters the condenser at about 25° C. and exits the condenser at about 60° C., a rise of about 35K. However, it is understood that in embodiments where the liquid medium is water from a civic water supply, the entry temperature of the water can vary. For example, the temperature may be dependent on climate, with water in cooler climates being approximately 15° C. while water from warmer climates can be as high as about 30-35° C.

Curve 1301 shows that refrigerant enters a condenser such as condenser 900 or condenser 1100 in a vapour phase and first interacts with tubes 20 carrying liquid medium on the fourth pass. Sensible heat is removed from the vapour refrigerant until the refrigerant condenses. On the third and second pass latent heat is removed from the refrigerant and the refrigerant changes state as it condenses resulting in the "flat" portion of curve 1301 when the refrigerant is present in both liquid and vapour phases. It is appreciated that the position of change between removal of sensible heat and removal of latent heat can occur at any suitable point on the third or fourth pass, though as depicted the change is on the fourth pass, indicating that the refrigerant can exist in both liquid and vapour phases in the fourth pass as well. However, the position of this point is understood to be substantially non-limiting. It is appreciated that a small degree of subcooling can occur in the second pass, however the substantial portion of subcooling of the liquid refrigerant occurs in the first pass as will now be described. However, it is understood that whether subcooling occurs or does not occur in the second pass is substantially non-limiting.

Furthermore, it is further appreciated that a significant portion of the subcooling occurs in the first pass (e.g. about 15K to 30K) as the liquid medium is heated; Indeed, in heat exchange systems, in which civic water is heated using heat recovered from, for example, a central energy exchange unit (such as central energy exchange unit 90), more heat can be transferred with a large degree of subcooling. A larger degree of subcooling is possible relative to cooling condensers used in chiller water applications due to the larger temperature change of the water (e.g. cooling condensers are generally appreciated to be typically heated only about 3K to 8K). For example, in many water chillers, the inlet condenser water is at about 30° C., while the condenser saturation temperature is around 35° C. for an approximate maximum possible 5K of subcooling. In heat recovery systems installed in a hot climate the inlet condenser water can be at about 20° C. while the condenser saturation temperature at full load is around 60° C. for a maximum possible subcooling amount of about 40K.

Figure 17:
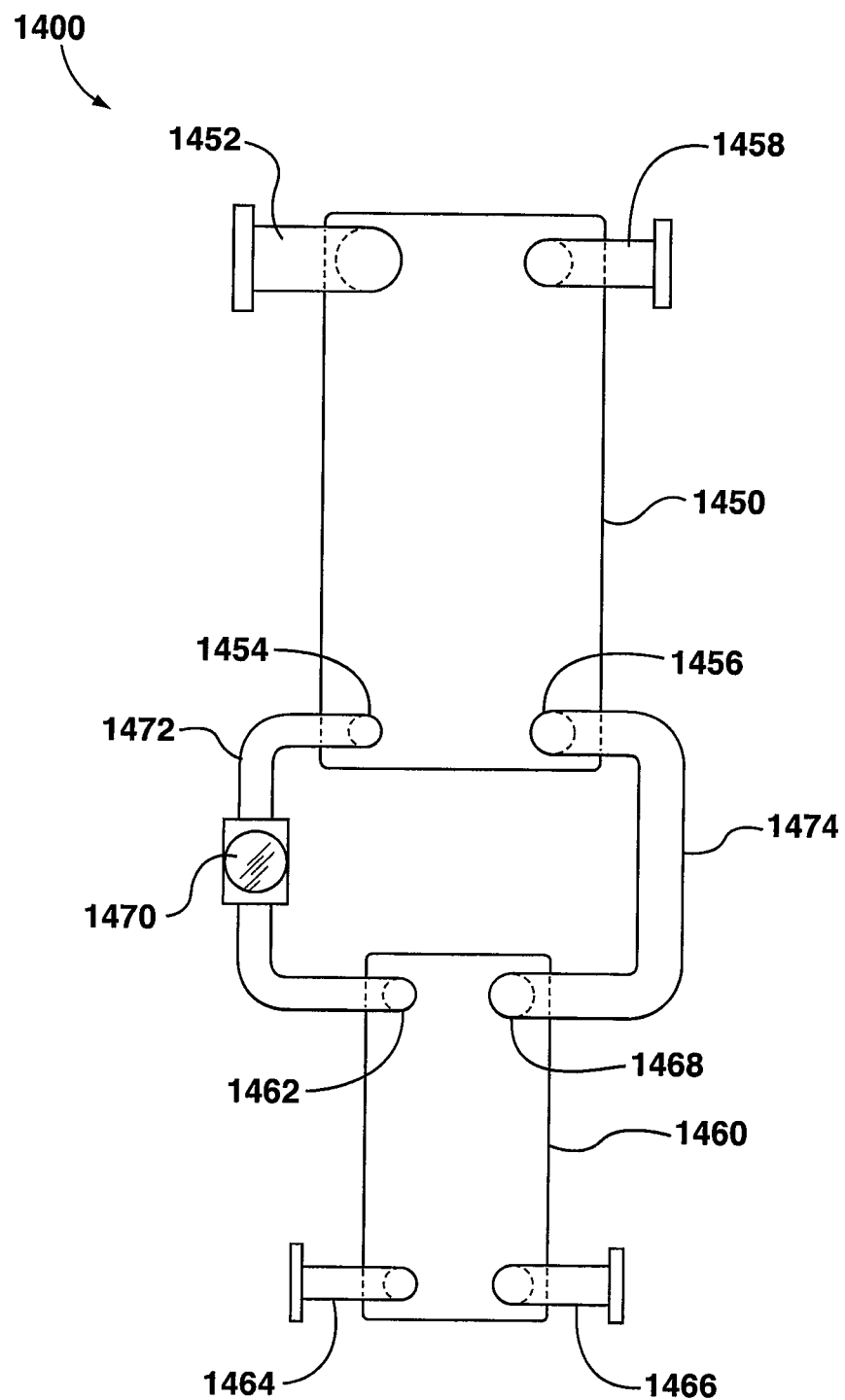
FIG. 17 shows yet another condenser system with subcooling, according to non-limiting embodiments.

Referring now to FIG. 17 a condenser system for subcooling liquid refrigerant is shown generally at 1400. System 1400 comprises a first condenser 1450 for transferring sensible and latent heat from a refrigerant in a vapour state to a liquid medium via at least one partition (not depicted) between refrigerant compartments and liquid medium compartments thereby causing the refrigerant to condense to liquid state. System 1400 further comprises a second heat exchanger 1460, located below first condenser 1450. Heat exchanger 1460 comprises first pass compartments for a liquid medium to flow there through to liquid medium compartments of first condenser 1450. As will be described below, the liquid refrigerant compartments of heat exchanger 1460 are enabled to collect liquid refrigerant from refrigerant compartments of condenser 1450. It will be appreciated that condenser 1450 is located vertically above heat exchanger 1460 to allow gravity to assist in the flow of liquid refrigerant from condenser 1450 to heat exchanger 1460. Heat exchanger 1460 further comprises at least one interface between first pass compartments and liquid refrigerant compartments for heat to flow from liquid refrigerant to liquid medium thereby subcooling the liquid refrigerant and heating the liquid medium on a first pass through system 1400. It is appreciated that the refrigerant velocity in condenser 1450 decreases rapidly as it condenses and the density increases by a factor of approximately 12 times. The refrigerant velocity in heat exchanger 1460 is nearly constant but can be significantly faster than the liquid refrigerant velocity at the bottom of condenser 1450 but may be similar to the vapour velocity at the top of condenser 1450. Hence, it is appreciated that the smaller cross-section refrigerant flow area of refrigerant compartments of heat exchanger 1460 cause the velocity of liquid refrigerant to increase thereby increasing the heat transfer coefficient of the liquid refrigerant.

A refrigerant inlet 1452 is provided in condenser 1450 for entry of refrigerant in the vapour state from a compressor discharge (e.g. compressor 320). Inside condenser 1450, sensible and latent heat is removed from the refrigerant vapour causing it to condense into a liquid. Liquid refrigerant proceeds from outlet 1454 in condenser 1450 through refrigerant piping 1472 to a refrigerant inlet 1462 in heat exchanger 1460. The amount of refrigerant in system 1400 is controlled such that heat exchanger 1460 is flooded with liquid refrigerant. An optional sight glass 1470 located in refrigerant piping 1472, can be used to confirm the correct amount of refrigerant in a system such as system 50*a*, 50*b*, 50*c*, or 50*d*. It is appreciated that the refrigerant charge is enough to completely flood one heat exchanger. Sensible heat is removed in heat exchanger 1460 subcooling the liquid refrigerant. Refrigerant outlet 1464 connects heat exchanger 1460 to an expansion control device (such as expansion valve 332) within the vapour compression cycle.

A fluid inlet 1466 is provided in heat exchanger 1460 for entry of the liquid medium to be pre-heated by subcooling of liquid refrigerant. Examples of liquid medium are water, such as civic water, glycol or the like. The liquid medium is piped in a counter flow fashion where the liquid refrigerant exiting condenser 1460 would be near the incoming liquid medium. The liquid medium proceeds from outlet 1468 in heat exchanger 1460 through fluid piping 1474 to a fluid Inlet 1456 in the condenser 1450. The liquid medium is further heated in condenser 1450 as it absorbs latent heat from the refrigerant as the refrigerant condenses from a vapour to a liquid state. The liquid medium is further heated in condenser 1450 as it absorbs sensible heat from the refrigerant vapour. A fluid outlet 1458 is provided in condenser 1450 for exit of the liquid medium after it has been fully heated.

It is appreciated that at least one of condenser 1450 and heat exchanger 1460 can comprise a plate heat exchanger. In embodiments where the liquid medium is potable water, for example from a civic water supply, each of condenser 1450 and heat exchanger 1460 can comprise a double walled heat exchanger.

Figure 18:
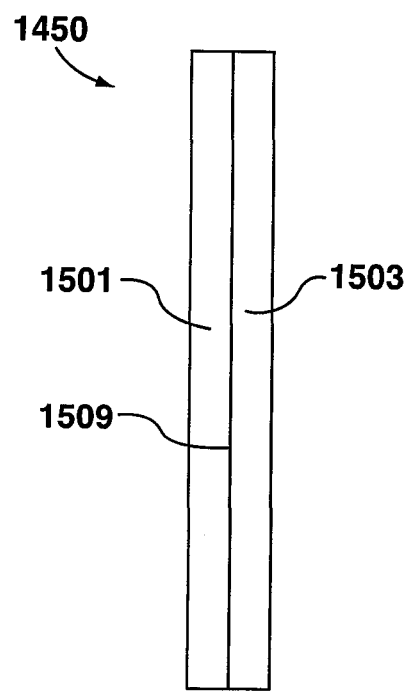
FIG. 18 shows a longitudinal cross-section of the condenser system of FIG. 16.
Figure 18:
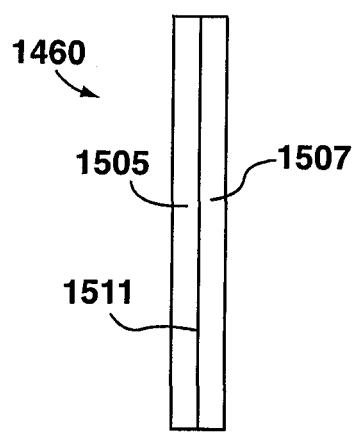

Referring now to FIG. 18, a portion of a longitudinal cross section of condenser 1450 and a portion of longitudinal cross section of heat exchanger 1460 is shown. It is appreciated that in condenser 1450, refrigerant flows through refrigerant compartment 1501 and exchanges heat with the liquid medium flowing through liquid medium compartment 1503, exchanging heat via partition 1509, causing the refrigerant to condense from a vapour phase to a liquid phase and the liquid medium to heat up. In heat exchanger 1460, liquid refrigerant flows through liquid refrigerant compartment 1505 and exchanges heat with the liquid medium flowing through first pass compartment 1507, exchanging heat via interface 1511, causing the liquid refrigerant to subcool and the liquid medium to heat up in the first pass through system 1400. It is appreciated that while only a single refrigerant compartment 1501 and a single liquid medium compartment 1503 of condenser 1450, other embodiments may comprise any suitable number of refrigerant compartments and any suitable number of liquid medium compartments. Similarly, it is appreciated, that while only a single liquid refrigerant compartment 1505 and a single first pass compartment 1507 of heat exchanger 1460, other embodiments may comprise any suitable number of refrigerant compartments and any suitable number of liquid medium compartments.

It is further appreciated that a cross-section refrigerant flow area of liquid refrigerant compartment 1505 is smaller than a cross-section refrigerant flow area of refrigerant compartment 1501. In other words, as a cross-sectional area of heat exchanger 1460 is smaller than a cross-sectional area of condenser 1450, such that the refrigerant compartments of heat exchanger 1460 are smaller than the refrigerant compartments of condenser 1450. Such a difference in cross-section causes the liquid refrigerant to increase in velocity as it collects in heat exchanger 1460. Hence, the difference in cross-section causes an effect similar to baffles 42 of condenser 900.

It is further appreciated that heat exchanger 1460 and piping 1472, 1474 can be provided as a kit for retrofitting condenser 1450 for subcooling. Hence, the efficiency of an existing condenser can easily be retrofit for subcooling using such a kit. It is appreciated that piping 1472, 1474 can be any suitable piping for respectively piping liquid refrigerant from condenser 1450 to heat exchanger 1460 and piping the liquid medium from heat exchanger 1460 to condenser 1450.

Figure 19:
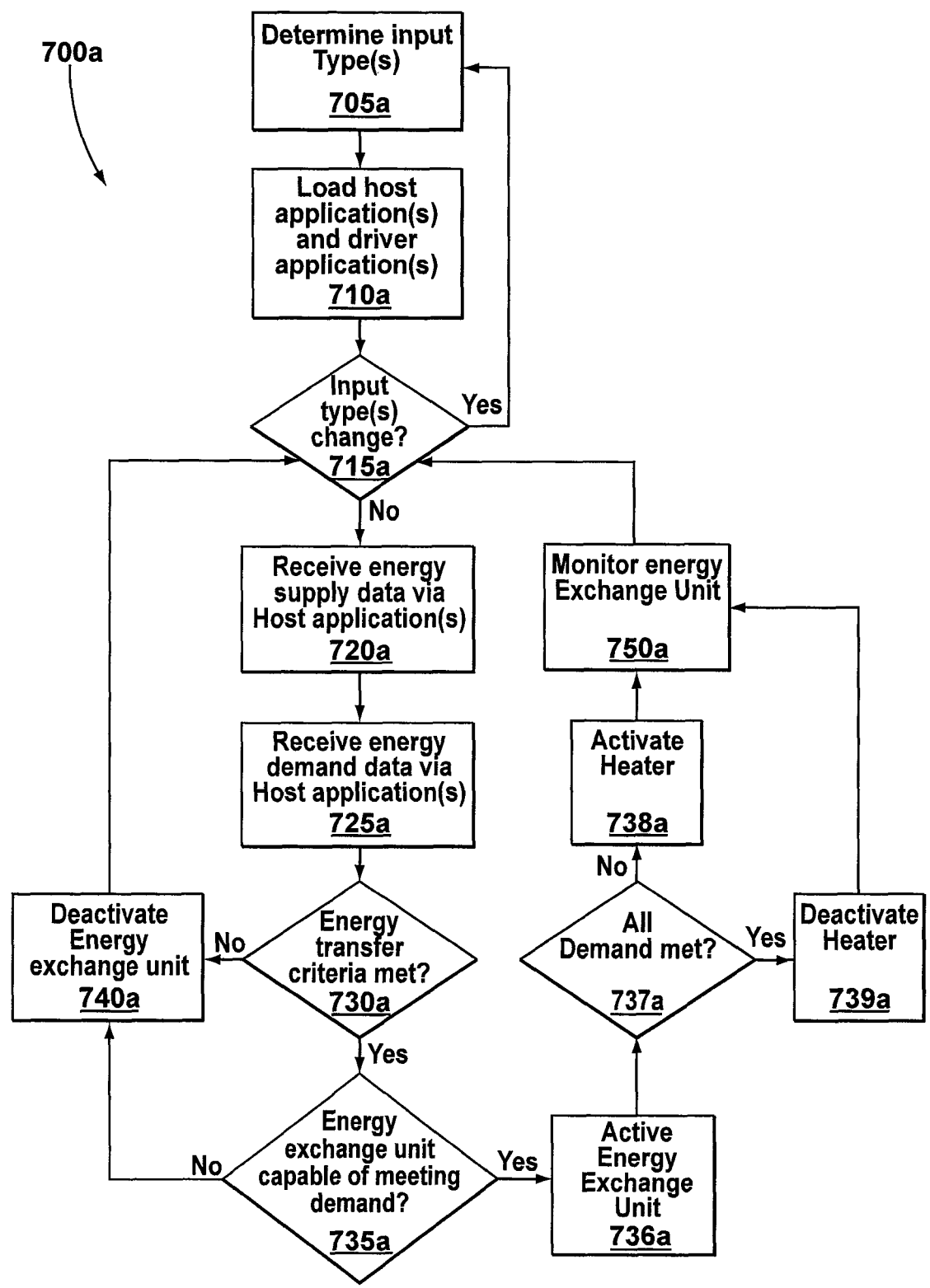
FIG. 19 shows a flow-chart depicting another exemplary method for controlling energy transfer.

Referring to FIG. 19, a method for operating systems 50*c* and 50*d* is shown generally at 700*a*. In system 50*d*, second controller 112*d* may be a dual set-point aquastat used in a similar manner as described in 50*c*. Method 700*a* generally contemplates that energy exchange unit 204*c* or 204*d* may be activated on its own, or activated in conjunction with heater 100, using second controller 112*c* or 112*d* and controller 208*c* or 208*d* to effect the various decision boxes in method 700*a* and the resulting controls from those decisions. For example, a "no" decision from box 737*a* is made by second controller 112*c* or 112*d* when the lower threshold temperature is sensed, thereby leading to activation of heater 100. It will thus be apparent that box 737*a*, box 738*a* and box 739*a* are ultimately effected without involvement of controller 208*c* or 208*d* or energy exchange unit 204*c* or 204*d*, and thus reflect the transparent retro-fit possibilities of the teachings herein.

Figure 20:
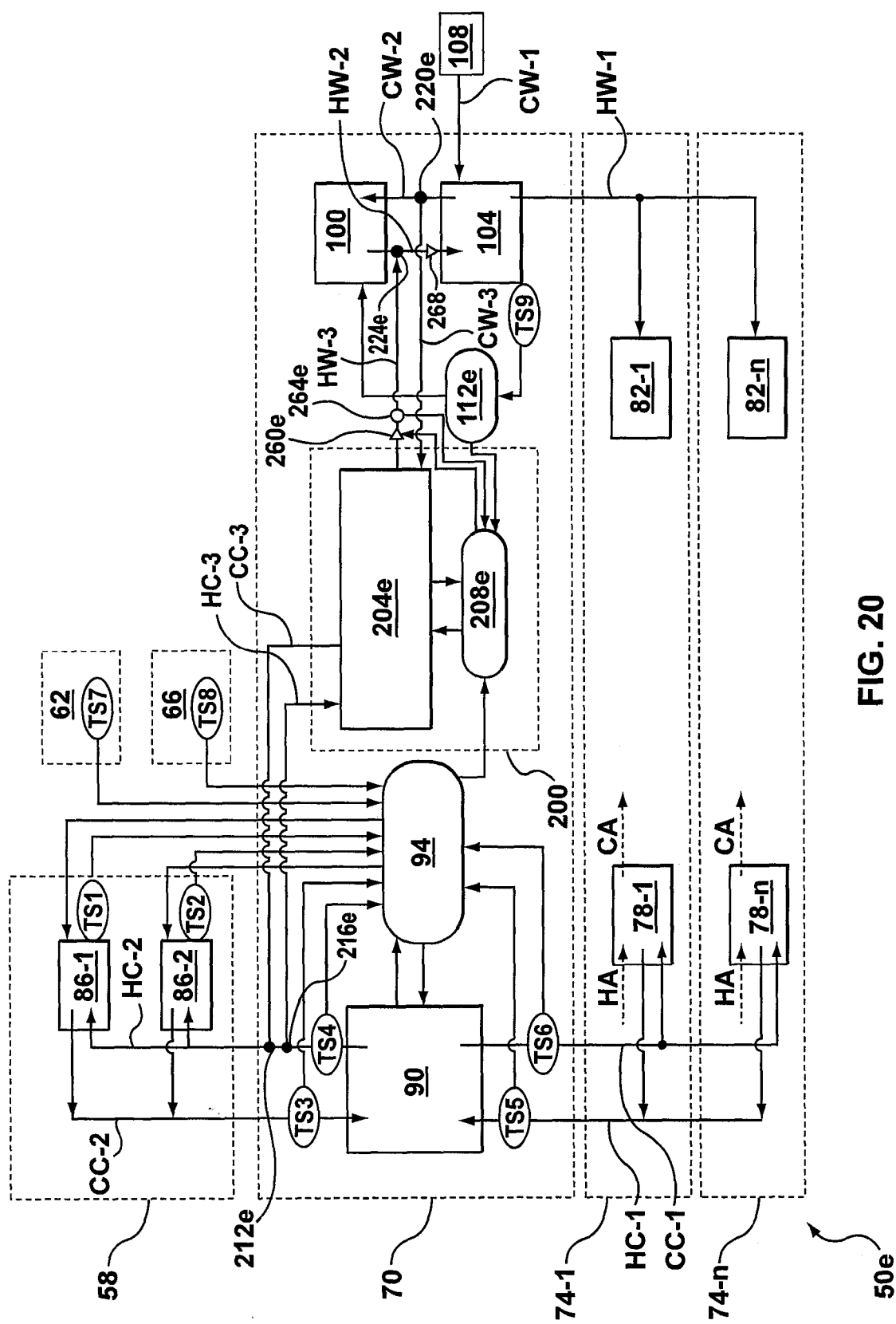
FIG. 20 shows another retrofit system incorporated into a complete air-conditioning system and separate hot water system for a multi-unit structure.

It should be understood that method 700*a* can also be used to operate other variants of system 50*a*, and not just system 50*c* and 50*d*. Such a variant is shown as system 50*e* in FIG. 20. System 50*e* is a variant of system 50*a* that contemplates the use of dual set-point second controller 112*e*. System 50*e* also contemplates a pump 260*e* and a flow-switch 264*e*, although pump 260*e* and flow-switch 264*e* could also be incorporated directly into energy exchange unit 204*e*. System 50e also expressly shows a pump 268 on conduit HW-2, though it should be understood that such a pump 268 can be part of a pre-existing hot water system.

In system 50e, as part of effecting block 735a, pump 260e is activated and then controller waits for confirmation of flow of water through conduit HW-3 by way of a signal from flow-switch 264e. If no flow of water is detected, then a "no" determination is made at block 735a and then controller 208e does not activate energy exchange unit 204e. Thus, flow-switch 264e is a safety mechanism to ensure pump 260e is working or that there is not some other failure preventing water from flowing into energy exchange unit 204e and out through conduit HW-3. If a flow of water is detected, then a "yes" determination can be made at block 735a and method 700a advances to block 736a so that energy exchange unit 204e is activated.

When energy exchange unit 204e is activated at block 736a, then at block 737a a determination is made if all of the hot water heating demand is being met. In system 50e, a "yes" determination at block 737a is reached if the temperature detected by second controller 112e of temperature sensor TS9 is more than the lower threshold, in which case at block 739a the heater 100 remains off. A "no" determination at block 737a is reached if the temperature detected by second controller 112e of temperature sensor TS9 is less than the lower threshold, in which case at block 738a the heater 100 is turned on. In this circumstance, energy is being provided by both heater 100 and energy exchange unit 204e. However, in the event of a failure of energy exchange unit 204e, second controller 112e can continue to control and activate heater 100 in the usual manner, thereby providing a transparent and uninterrupted supply of hot water.

The claims attached hereto solely define the scope of monopoly sought.

The invention claimed is:

1. A retrofit energy exchange system comprising:
 a first connection to a self-contained pre-existing first energy transfer sub-system for removing energy from a living space; said first energy transfer sub-system having a potential excess supply of energy available at said first connection as a result of removing energy;
 a second connection to a self-contained pre-existing second energy transfer sub-system for providing energy to a living space; said second energy transfer sub-system having a potential demand for energy;
 an energy exchange unit connectable to said first connection to receive said potential excess supply of energy;
 said energy exchange unit connectable to said second connection to supply said potential excess supply of energy, wherein said energy exchange unit pumps said potential excess supply of energy from said first connection to said second connection;
 an energy exchange unit controller connectable to receive an input from at least one of said first energy transfer sub-system and said second energy transfer sub-system;
 said energy exchange unit controller configured to activate said energy exchange unit when said energy exchange unit controller determines from said input, that a present excess supply of energy from said first energy transfer sub-system is available to satisfy at least a portion of a present demand for energy at said second energy transfer sub-system such that any removal of energy or any supply of energy is provided, at least in part, via said energy exchange unit;
 said energy exchange unit controller configured to deactivate said energy exchange unit when said energy exchange unit controller determines from said input, said energy exchange unit is unable to satisfy at least a portion of a present demand for energy at said second energy transfer sub-system such that any removal of energy is performed solely by said pre-existing first energy transfer sub-system and any supply of energy is performed solely by said pre-existing second energy transfer sub-system.

2. The system of claim 1 wherein said first energy transfer sub-system is an air conditioning system.

3. The system of claim 1 wherein said second energy transfer sub-system is a hot water heating system.

4. The system of claim 1, wherein said energy exchange controller is additionally configured to dynamically adjust determinations for activating or deactivating said energy exchange unit based on different types of said input.

5. The system of claim 1, wherein said input comprises a temperature sensor connected to said first connection and for receiving a temperature of coolant associated with said first energy transfer sub-system.

6. The system of claim 1, wherein said input additionally comprises a temperature sensor connected to said second connection and for receiving a temperature of hot water associated with said second energy transfer sub-system.

7. The system of claim 3, wherein said input additionally comprises a temperature sensor connected to a tank of said hot water heating system.

8. The system of claim 2, wherein said first connection comprises a first valve connected to a coolant line of said air conditioning system and a second valve connected to said coolant line of said air conditioning system.

9. The system of claim 8 further comprising a pump or a pressure regulator in said first connection such that a pressure in said coolant line is substantially the same as if said first connection did not exist.

10. The system of claim 3, comprising a three-way valve connected between a preexisting heating unit in said hot water heating system and a hot water tank; said three-way valve controllable to either direct hot water from said heating unit to said hot water tank or to direct hot water from said energy exchange unit to said hot water tank.

11. The system of claim 10 wherein said three-way valve is a variable valve such that a first portion of hot water can be directed from said heating unit to said hot water tank and a second portion of hot water can be directed from said energy exchange unit to said hot water tank.

12. The system of claim 3, comprising wherein a hot water heating pathway of said energy exchange unit is positioned between a cold water supply and a hot water tank of said hot water heating system in order to preheat said cold water before was cold water reaches said hot water tank.

13. The system of claim 3, wherein said hot water tank supplies at least one hot water demand and wherein an output of said hot water tank feeds back into a cold water supply in order to provide substantially instantaneous hot water to said at least one hot water demand.

14. An energy exchange unit controller encoded with codes for directing a processor to:
 receive an input from a first energy transfer sub-system and a second energy transfer sub-system;
 to activate an energy exchange unit when said processor determines from said input, that a present excess supply of energy from said first energy transfer sub-system is available to satisfy at least a portion of a present demand for energy at said second energy transfer sub-system such that any removal of energy or any supply of energy is provided, at least in part, via said energy exchange unit, wherein said energy exchange unit pumps said potential excess supply of energy from said first connection to said second connection; and deactivate said energy exchange unit when said energy exchange unit controller determines from said input, said energy exchange unit is unable to satisfy at least a portion of a present demand for energy at said second energy transfer sub-system such that any removal of energy is performed solely by said pre-existing first energy transfer sub-system and any supply of energy is performed solely by said pre-existing second energy transfer sub-system.

\* \* \* \* \*